United States Patent
Tsuchiya et al.

(10) Patent No.: US 6,920,022 B1
(45) Date of Patent: Jul. 19, 2005

(54) MAGNETIC TRANSDUCER, THIN FILM MAGNETIC HEAD, METHOD OF MANUFACTURING MAGNETIC TRANSDUCER AND METHOD OF MANUFACTURING THIN FILM MAGNETIC HEAD

(75) Inventors: Yoshihiro Tsuchiya, Tokyo (JP); Satoru Araki, Tokyo (JP); Masashi Sano, Tokyo (JP); Takumi Uesugi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/769,760

(22) Filed: Jan. 26, 2001

(30) Foreign Application Priority Data

Jan. 28, 2000 (JP) ........................................ 2000-024805

(51) Int. Cl.$^7$ ............................................. G11B 5/127
(52) U.S. Cl. .................................................. 360/324.11
(58) Field of Search ............................ 360/324, 324.11, 360/324.12

(56) References Cited

U.S. PATENT DOCUMENTS

| 6,268,985 B1 * | 7/2001 | Pinarbasi ................ 306/324.12 |
| 6,338,899 B1 * | 1/2002 | Fukuzawa et al. ........... 428/332 |

FOREIGN PATENT DOCUMENTS

| JP | A 10-65232 | 3/1998 |
| JP | A 11-135857 | 5/1999 |
| JP | 11-227530 | 8/1999 |
| JP | A 2000-252548 | 9/2000 |
| JP | A 2001-237471 | 8/2001 |

OTHER PUBLICATIONS

"CoFe Specular Spin Valves with a Nano Oxide Layer". Kamiguchi et al., 1999 Digests of Interamg.

* cited by examiner

Primary Examiner—George J. Letscher
(74) Attorney, Agent, or Firm—Oliff & Berridge, PLC

(57) ABSTRACT

Provided are a magnetic transducer having good thermal stability, a thin film magnetic head, a method of manufacturing a magnetic transducer and a method of manufacturing a thin film magnetic head. A stack of an MR element has a stacked structure comprising an underlayer, a first soft magnetic layer, a second soft magnetic layer, a nonmagnetic layer, a ferromagnetic layer, an antiferromagnetic layer and a capping layer, which are stacked in this order on the underlayer. The ferromagnetic layer is divided into a bottom layer and a top layer in the direction of stack. A ferromagnetic interlayer having magnetism and having higher electrical resistance than the electrical resistance of the ferromagnetic layer is formed between the bottom layer and the top layer. The ferromagnetic interlayer magnetically integrates the bottom layer with the top layer and limits a path for electrons moving through the stack, thereby improving the rate of resistance change. Furthermore, the ferromagnetic interlayer contains, as an additive, at least one element in a group consisting of Mn, Cr, Ni, Cu, Rh, Ir and Pt and thus prevents heat deterioration in the stack.

13 Claims, 15 Drawing Sheets

MAGNETIC TRANSDUCER, THIN FILM MAGNETIC HEAD, METHOD OF MANUFACTURING MAGNETIC TRANSDUCER AND METHOD OF MANUFACTURING THIN FILM MAGNETIC HEAD

BACKGROUND OF THE INVENTION

1. Field of the Invention

The invention relates to a magnetic transducer, a thin film magnetic head using the same, a method of manufacturing a magnetic transducer and a method of manufacturing a thin film magnetic head. More particularly, the invention relates to a magnetic transducer having good thermal stability, a thin film magnetic head using the same, a method of manufacturing a magnetic transducer and a method of manufacturing a thin film magnetic head.

2. Description of the Related Art

Recently, an improvement in performance of a thin film magnetic head has been sought in accordance with an increase in a surface recording density of a hard disk or the like. A composite thin film magnetic head, which has a stacked structure comprising a reproducing head having a type of magnetic transducer, i.e., a magnetoresistive element (hereinafter referred to as an MR element) and a recording head having an inductive magnetic transducer, is widely used as the thin film magnetic head.

MR elements include an AMR element using a magnetic film (an AMR film) exhibiting an anisotropic magnetoresistive effect (an AMR effect), a GMR element using a magnetic film (a GMR film) exhibiting a giant magnetoresistive effect (a GMR effect), and so on.

The reproducing head using the AMR element is called an AMR head, and the reproducing head using the GMR element is called a GMR head. The AMR head is used as the reproducing head whose surface recording density exceeds 1 Gbit/inch$^2$ (0.16 Gbit/cm$^2$), and the GMR head is used as the reproducing head whose surface recording density exceeds 3 Gbit/inch$^2$ (0.46 Gbit/cm$^2$).

As the GMR film, a "multilayered type (antiferromagnetic type)" film, an "inductive ferromagnetic type" film, a "granular type" film, a "spin valve type" film and the like are proposed. Of these types of films, the spin valve type GMR film is considered to have a relatively simple structure, to exhibit a great change in resistance even under a low magnetic field and to be suitable for mass production.

FIG. 17 shows the structure of a general spin valve type GMR film (hereinafter referred to as a spin valve film). A surface indicated by reference symbol S in FIG. 17 corresponds to a surface facing a magnetic recording medium. The spin valve film has a stacked structure comprising an underlayer 91, a soft magnetic layer 92, a nonmagnetic layer 94, a ferromagnetic layer 95, an antiferromagnetic layer 96 and a capping layer 97, which are stacked in this order on the underlayer 91. In the spin valve film, the orientation of magnetization Mp of the ferromagnetic layer 95 is fixed by exchange coupling between the ferromagnetic layer 95 and the antiferromagnetic layer 96. The orientation of magnetization Mf of the soft magnetic layer 92 freely changes according to an external magnetic field. Resistance changes according to a relative angle between the orientation of the magnetization Mf of the soft magnetic layer 92 and the orientation of the magnetization Mp of the ferromagnetic layer 95.

For magnetic recording at ultra-high density exceeding 20 Gbit/inch$^2$ (3.1 Gbit/cm$^2$), it has been recently desired that the rate of change in electrical resistance of the spin valve film (hereinafter referred to as the rate of resistance change) should be made higher. For example, a cited reference "CoFe specular spin valves with a nano oxide layer", 1999 Digests of INTERMAG 99, published on May 18, 1999 discloses that an oxide film called an NOL should be provided in the ferromagnetic layer of the spin valve film.

However, the above-mentioned cited reference gives no description about specific conditions such as a material and thickness of the oxide film called the NOL and a position into which the oxide film is to be inserted. Therefore, the applicant has proposed that the rate of resistance change should be increased by providing an interlayer made of, for example, an oxide film in an optimum position of the ferromagnetic layer or the soft magnetic layer of the spin valve film (see Japanese Patent Application No. Hei 11-227530).

However, the above-mentioned method may be unable to obtain a satisfactory result of thermal stability although the method can increase the rate of resistance change. The method has a problem, particularly in the case in which the interlayer is provided in the ferromagnetic layer.

SUMMARY OF THE INVENTION

The invention is designed to overcome the foregoing problem. It is an object of the invention to provide a magnetic transducer having good thermal stability, a thin film magnetic head, a method of manufacturing a magnetic transducer and a method of manufacturing a thin film magnetic head.

A magnetic transducer according to a first aspect of the invention comprises: a nonmagnetic layer having a pair of surfaces opposing each other; a soft magnetic layer formed on one surface of the nonmagnetic layer; a ferromagnetic layer formed on the other surface of the nonmagnetic layer; and an antiferromagnetic layer formed on the ferromagnetic layer on the side opposite to the nonmagnetic layer, wherein an interlayer is formed in a layer which is at least either the soft magnetic layer or the ferromagnetic layer, the interlayer has magnetism and has higher electrical resistance than the electrical resistance of at least a part of the layer in which the interlayer is formed, and the interlayer contains at least one element in a group consisting of manganese (Mn), chromium (Cr), nickel (Ni), copper (Cu), rhodium (Rh), iridium (Ir) and platinum (Pt).

In the magnetic transducer according to the first aspect of the invention, the interlayer formed in at least either the soft magnetic layer or the ferromagnetic layer reflects at least some electrons and thus limits a path for the electrons, and therefore the rate of resistance change is improved. Furthermore, the interlayer contains at least one element in a group consisting of Mn, Cr, Ni, Cu, Rh, Ir and Pt, and therefore high thermal stability is obtained.

A magnetic transducer according to a second aspect of the invention comprises: a nonmagnetic layer having a pair of surfaces opposing each other; a soft magnetic layer formed on one surface of the nonmagnetic layer; a ferromagnetic layer formed on the other surface of the nonmagnetic layer; and an antiferromagnetic layer formed on the ferromagnetic layer on the side opposite to the nonmagnetic layer; an interlayer formed in a layer which is at least either the soft magnetic layer or the ferromagnetic layer, the interlayer having magnetism and having higher electrical resistance than the electrical resistance of at least a part of the layer in which the interlayer is formed; and an inserted layer formed at least either between the interlayer and the nonmagnetic layer or on the side opposite to the nonmagnetic layer with respect to the interlayer, the inserted layer containing at least one element in a group consisting of Mn, Cr, Ni, Cu, Rh, Ir and Pt.

In the magnetic transducer according to the second aspect of the invention, the interlayer formed in at least either the soft magnetic layer or the ferromagnetic layer reflects at least some electrons and thus limits a path for the electrons, and therefore the rate of resistance change is improved. Furthermore, the inserted layer containing at least one element in a group consisting of Mn, Cr, Ni, Cu, Rh, Ir and Pt is formed at least either between the interlayer and the nonmagnetic layer or on the interlayer on the side opposite to the nonmagnetic layer, and therefore high thermal stability is obtained.

Preferably, a thickness of the inserted layer is more than 0.03 nm and less than 0.6 nm.

A magnetic transducer according to a third aspect of the invention comprises: a nonmagnetic layer having a pair of surfaces opposing each other; a soft magnetic layer formed on one surface of the nonmagnetic layer; a ferromagnetic layer formed on the other surface of the nonmagnetic layer; an antiferromagnetic layer formed on the ferromagnetic layer on the side opposite to the nonmagnetic layer; an interlayer formed in at least either the soft magnetic layer or the ferromagnetic layer, the interlayer having magnetism and having higher electrical resistance than the electrical resistance of at least a part of the layer in which the interlayer is formed; and a thermal stabilization layer formed at least either between the interlayer and the nonmagnetic layer or on the side opposite to the nonmagnetic layer with respect to the interlayer.

In the magnetic transducer according to the third aspect of the invention, the interlayer formed in either the soft magnetic layer or the ferromagnetic layer reflects at least some electrons and thus limits a path for the electrons, and therefore the rate of resistance change is improved. Furthermore, the thermal stabilization layer is formed at least either between the interlayer and the nonmagnetic layer or on the interlayer on the side opposite to the nonmagnetic layer, and therefore high thermal stability is obtained.

Preferably, a thickness of the interlayer is from 0.5 nm to 1 nm inclusive. Preferably, the interlayer contains at least one element in a group consisting of O (oxygen) and N (nitrogen). Preferably, the interlayer contains at least one of elements which are contained in the layer in which the interlayer is formed. Preferably, the soft magnetic layer has a first soft magnetic layer containing at least Ni in a group consisting of Ni, Co (cobalt), Fe (iron), Ta (tantalum), Cr, Rh, Mo (molybdenum) and Nb (niobium), and a second soft magnetic layer containing at least Co in a group consisting of Ni, Co and Fe. Preferably, the ferromagnetic layer contains at least Co in a group consisting of Co and Fe.

A thin film magnetic head according to a first aspect of the invention has a magnetic transducer, which comprises: a nonmagnetic layer having a pair of surfaces opposing each other; a soft magnetic layer formed on one surface of the nonmagnetic layer; a ferromagnetic layer formed on the other surface of the nonmagnetic layer; and an antiferromagnetic layer formed on the ferromagnetic layer on the side opposite to the nonmagnetic layer, wherein an interlayer is formed in a layer which is at least either the soft magnetic layer or the ferromagnetic layer, the interlayer has magnetism and has higher electrical resistance than the electrical resistance of at least a part of the layer in which the interlayer is formed, and the interlayer contains at least one element in a group consisting of Mn, Cr, Ni, Cu, Rh, Ir and Pt.

In the thin film magnetic head according to the first aspect of the invention, the interlayer formed in at least either the soft magnetic layer or the ferromagnetic layer reflects at least some electrons and thus limits a path for the electrons, and therefore the rate of resistance change is improved. Furthermore, the interlayer contains at least one element in a group consisting of Mn, Cr, Ni, Cu, Rh, Ir and Pt, and therefore high thermal stability is obtained.

A thin film magnetic head according to a second aspect of the invention has a magnetic transducer, which comprises: a nonmagnetic layer having a pair of surfaces opposing each other; a soft magnetic layer formed on one surface of the nonmagnetic layer; a ferromagnetic layer formed on the other surface of the nonmagnetic layer; and an antiferromagnetic layer formed on the ferromagnetic layer on the side opposite to the nonmagnetic layer an interlayer formed in a layer which is at least either the soft magnetic layer or the ferromagnetic layer, the interlayer having magnetism and having higher electrical resistance than the electrical resistance of at least a part of the layer in which the interlayer is formed; and an inserted layer formed at least either between the interlayer and the nonmagnetic layer or on the side opposite to the nonmagnetic layer with respect to the interlayer, the inserted layer containing at least one element in a group consisting of Mn, Cr, Ni, Cu, Rh, Ir and Pt.

In the thin film magnetic head according to the second aspect of the invention, the interlayer formed in at least either the soft magnetic layer or the ferromagnetic layer reflects at least some electrons and thus limits a path for the electrons, and therefore the rate of resistance change is improved. Furthermore, the inserted layer containing at least one element in a group consisting of Mn, Cr, Ni, Cu, Rh, Ir and Pt is formed at least either between the interlayer and the nonmagnetic layer or on the interlayer on the side opposite to the nonmagnetic layer, and therefore high thermal stability is obtained.

A thin film magnetic head according to a third aspect of the invention has a magnetic transducer, which comprises: a nonmagnetic layer having a pair of surfaces opposing each other; a soft magnetic layer formed on one surface of the nonmagnetic layer; a ferromagnetic layer formed on the other surface of the nonmagnetic layer; and an antiferromagnetic layer formed on the ferromagnetic layer on the side opposite to the nonmagnetic layer; an interlayer formed in at least either the soft magnetic layer or the ferromagnetic layer, the interlayer having magnetism and having higher electrical resistance than the electrical resistance of at least a part of the layer in which the interlayer is formed; a thermal stabilization layer formed at least either between the interlayer and the nonmagnetic layer or on the side opposite to the nonmagnetic layer with respect to the interlayer.

In the thin film magnetic head according to the third aspect of the invention, the interlayer formed in either the soft magnetic layer or the ferromagnetic layer reflects at least some electrons and thus limits a path for the electrons, and therefore the rate of resistance change is improved. Furthermore, the thermal stabilization layer is formed at least either between the interlayer and the nonmagnetic layer or on the interlayer on the side opposite to the nonmagnetic layer, and therefore high thermal stability is obtained.

According to a first aspect of the invention, a method of manufacturing a magnetic transducer comprises: a nonmagnetic layer having a pair of surfaces opposing each other; a soft magnetic layer formed on one surface of the nonmagnetic layer; a ferromagnetic layer formed on the other surface of the nonmagnetic layer; and an antiferromagnetic layer formed on the ferromagnetic layer on the side opposite to the nonmagnetic layer includes the step of forming an interlayer in a layer which is at least either the soft magnetic layer or the ferromagnetic layer, the interlayer having magnetism and having higher electrical resistance than the electrical resistance of at least a part of the layer in which the interlayer is formed, the interlayer containing at least one element in a group consisting of Mn, Cr, Ni, Cu, Rh, Ir and Pt.

In the method of manufacturing a magnetic transducer according to the first aspect of the invention, the magnetic transducer having the interlayer is obtained. The interlayer is formed in at least either the soft magnetic layer or the ferromagnetic layer. The interlayer has magnetism and has higher electrical resistance than the electrical resistance of at least a part of the layer in which the interlayer is formed. The interlayer contains at least one element in a group consisting of Mn, Cr, Ni, Cu, Rh, Ir and Pt.

Preferably, the step of forming the interlayer includes the steps of: forming a metal layer made of at least one element in a group consisting of Mn, Cr, Ni, Cu, Rh, Ir and Pt in at least either the soft magnetic layer or the ferromagnetic layer; and oxidizing, nitriding, or oxidizing and nitriding a part of at least either the soft magnetic layer or the ferromagnetic layer and the metal layer.

According to a second aspect of the invention, a method of manufacturing a magnetic transducer comprises: a nonmagnetic layer having a pair of surfaces opposing each other; a soft magnetic layer formed on one surface of the nonmagnetic layer; a ferromagnetic layer formed on the other surface of the nonmagnetic layer; and an antiferromagnetic layer formed on the ferromagnetic layer on the side opposite to the nonmagnetic layer includes the step of forming an interlayer in a layer which is at least either the soft magnetic layer or the ferromagnetic layer, the interlayer having magnetism and having higher electrical resistance than the electrical resistance of at least a part of the layer in which the interlayer is formed; and forming an inserted layer at least either between the interlayer and the nonmagnetic layer or on the side opposite to the nonmagnetic layer with respect to the interlayer, the inserted layer containing at least one element in a group consisting of Mn, Cr, Ni, Cu, Rh, Ir and Pt.

In the method of manufacturing a magnetic transducer according to the second aspect of the invention, the magnetic transducer having the interlayer and the inserted layer is obtained. The interlayer is formed in at least either the soft magnetic layer or the ferromagnetic layer. The inserted layer is formed at least either between the interlayer and the nonmagnetic layer or on the interlayer on the side opposite to the nonmagnetic layer. The inserted layer is made of at least one element in a group consisting of Mn, Cr, Ni, Cu, Rh, Ir and Pt.

According to a first aspect of the invention, a method of manufacturing a thin film magnetic head having a magnetic transducer comprises: a nonmagnetic layer having a pair of surfaces opposing each other; a soft magnetic layer formed on one surface of the nonmagnetic layer; a ferromagnetic layer formed on the other surface of the nonmagnetic layer; and an antiferromagnetic layer formed on the ferromagnetic layer on the side opposite to the nonmagnetic layer includes the step of forming an interlayer in a layer which is at least either the soft magnetic layer or the ferromagnetic layer, the interlayer having magnetism and having higher electrical resistance than the electrical resistance of at least a part of the layer in which the interlayer is formed, the interlayer containing at least one element in a group consisting of Mn, Cr, Ni, Cu, Rh, Ir and Pt.

In the method of manufacturing a thin film magnetic head according to the first aspect of the invention, the magnetic transducer having the interlayer is obtained. The interlayer is formed in at least either the soft magnetic layer or the ferromagnetic layer. The interlayer has magnetism and has higher electrical resistance than the electrical resistance of at least a part of the layer in which the interlayer is formed. The interlayer contains at least one element in a group consisting of Mn, Cr, Ni, Cu, Rh, Ir and Pt.

According to a second aspect of the invention, a method of manufacturing a thin film magnetic head having a magnetic transducer comprises: a nonmagnetic layer having a pair of surfaces opposing each other; a soft magnetic layer formed on one surface of the nonmagnetic layer; a ferromagnetic layer formed on the other surface of the nonmagnetic layer; and an antiferromagnetic layer formed on the ferromagnetic layer on the side opposite to the nonmagnetic layer includes the step of forming an interlayer in a layer which is at least either the soft magnetic layer or the ferromagnetic layer, the interlayer having magnetism and having higher electrical resistance than the electrical resistance of at least a part of the layer in which the interlayer is formed; and forming an inserted layer at least either between the interlayer and the nonmagnetic layer or on the side opposite to the nonmagnetic layer with respect to the interlayer, the inserted layer containing at least one element in a group consisting of Mn, Cr, Ni, Cu, Rh, Ir and Pt.

In the method of manufacturing a thin film magnetic head according to the second aspect of the invention, the magnetic transducer having the interlayer and the inserted layer is obtained. The interlayer is formed in at least either the soft magnetic layer or the ferromagnetic layer. The inserted layer is formed at least either between the interlayer and the nonmagnetic layer or on the interlayer on the side opposite to the nonmagnetic layer. The inserted layer is made of at least one element in a group consisting of Mn, Cr, Ni, Cu, Rh, Ir and Pt.

Other and further objects, features and advantages of the invention will appear more fully from the following description.

DETAILED DESCRIPTION OF THE PREFERRED EMBODIMENTS

First Embodiment
Structures of MR Element and Thin Film Magnetic Head

Firstly, the respective structures of an MR element that is a specific example of a magnetic transducer according to a first embodiment of the invention and a thin film magnetic head using the MR element will be described with reference to FIGS. 1 to 7.

Figure 1:
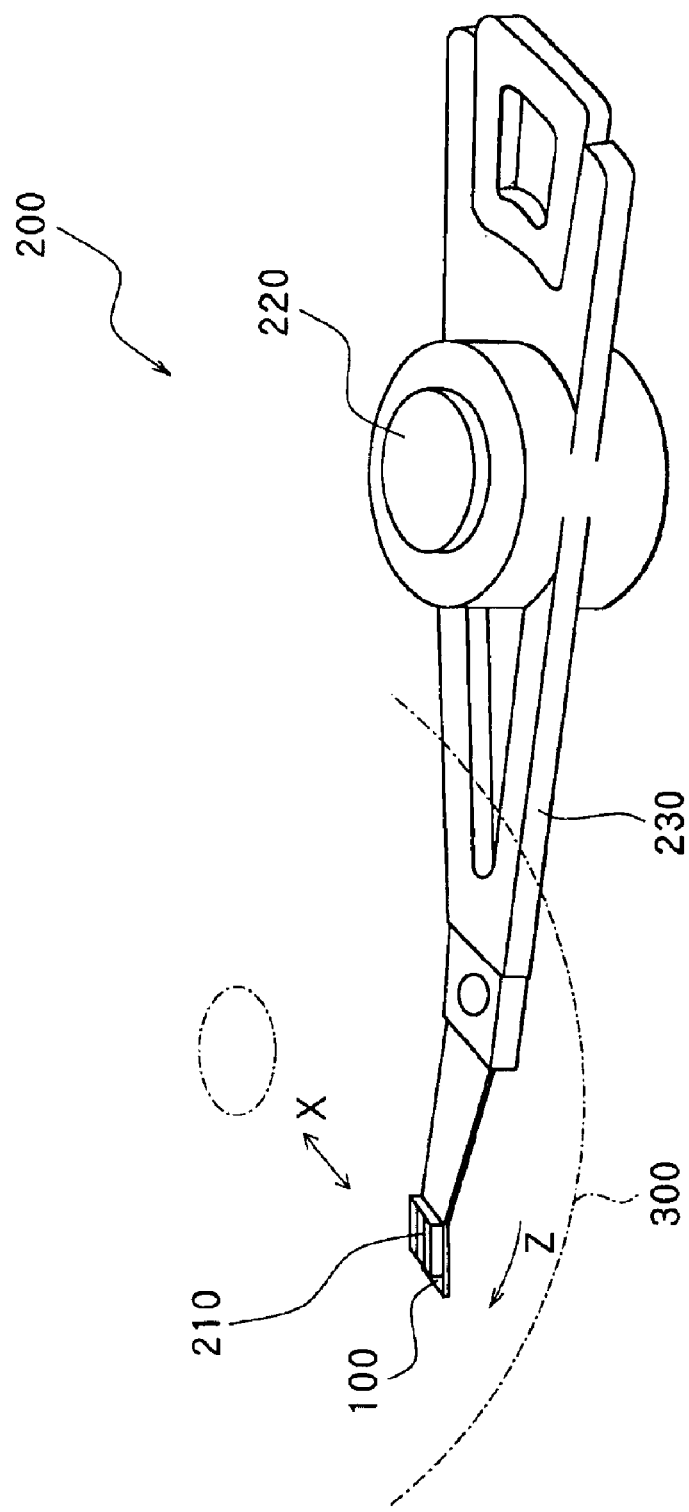
FIG. 1 is a perspective view of a configuration of an actuator arm comprising a thin film magnetic head including a magnetic transducer according to a first embodiment of the invention.

FIG. 1 shows the configuration of an actuator arm 200 comprising a thin film magnetic head 100 according to the embodiment of the invention. The actuator arm 200 is used in a hard disk drive (not shown) or the like, for example. The actuator arm 200 has a slider 210 on which the thin film magnetic head 100 is formed. For example, the slider 210 is mounted on the end of an arm 230 rotatably supported by a supporting pivot 220. The arm 230 is rotated by a driving force of a voice coil motor (not shown), for example. Thus, the slider 210 moves in a direction x in which the slider 210 crosses a track line along a recording surface of a magnetic recording medium 300 such as a hard disk (a lower surface of the recording surface in FIG. 1). For example, the magnetic recording medium 300 rotates in a direction z substantially perpendicular to the direction x in which the slider 210 crosses the track line. The magnetic recording medium 300 rotates and the slider 210 moves in the above-mentioned manner, whereby information is recorded on the magnetic recording medium 300 or recorded information is read out from the magnetic recording medium 300.

Figure 2:
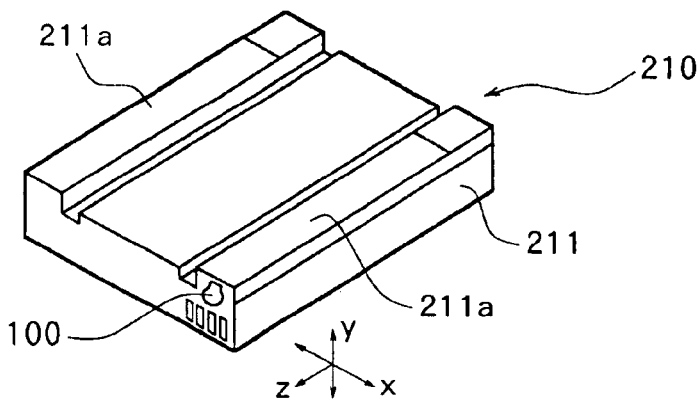
FIG. 2 is a perspective view of a configuration of a slider of the actuator arm shown in FIG. 1.

FIG. 2 shows the configuration of the slider 210 shown in FIG. 1. The slider 210 has a block-shaped base 211 made of $Al_2O_3$—TiC (altic), for example. The base 211 is substantially hexahedral, for instance. One face of the hexahedron closely faces the recording surface of the magnetic recording medium 300 (see FIG. 1). A surface facing the recording surface of the magnetic recording medium 300 is called an air bearing surface (ABS) 211a. When the magnetic recording medium 300 rotates, airflow generated between the recording surface of the magnetic recording medium 300 and the air bearing surface 211a allows the slider 210 to slightly move away from the recording surface in a direction y opposite to the recording surface. Thus, a constant clearance is created between the air bearing surface 211a and the magnetic recording medium 300. The thin film magnetic head 100 is provided on one side (the left side in FIG. 2) adjacent to the air bearing surface 211a of the base 211.

Figure 3:
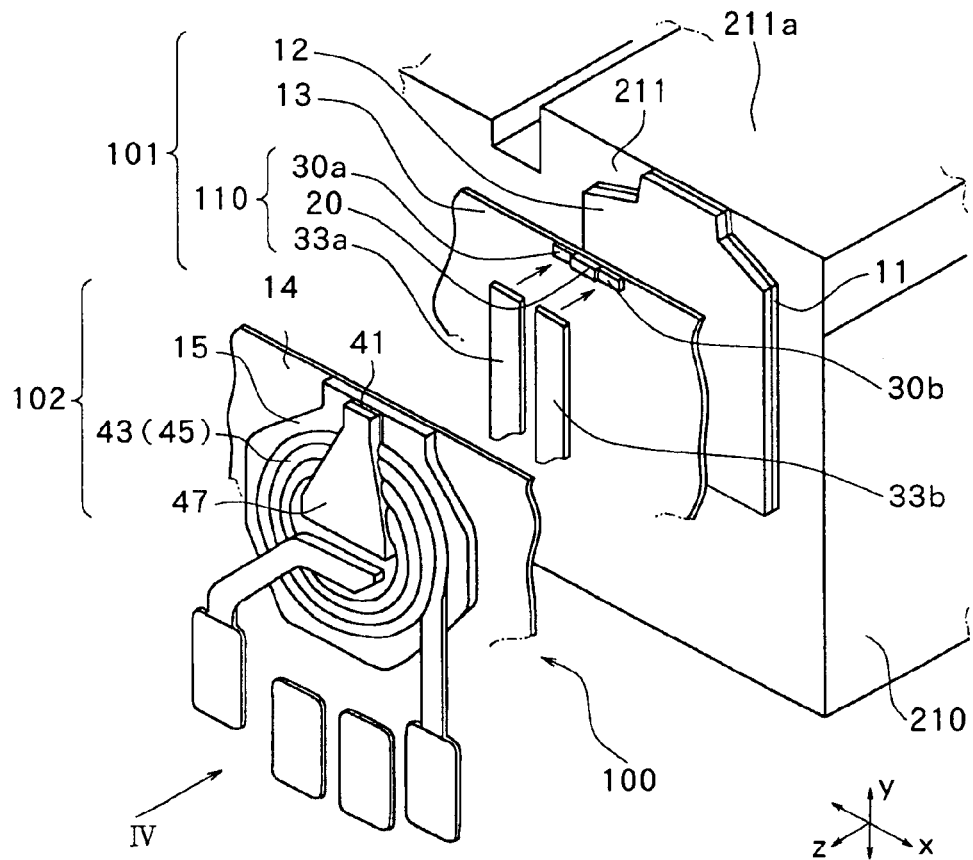
FIG. 3 is an exploded perspective view of a structure of the thin film magnetic head according to the first embodiment.
Figure 4:
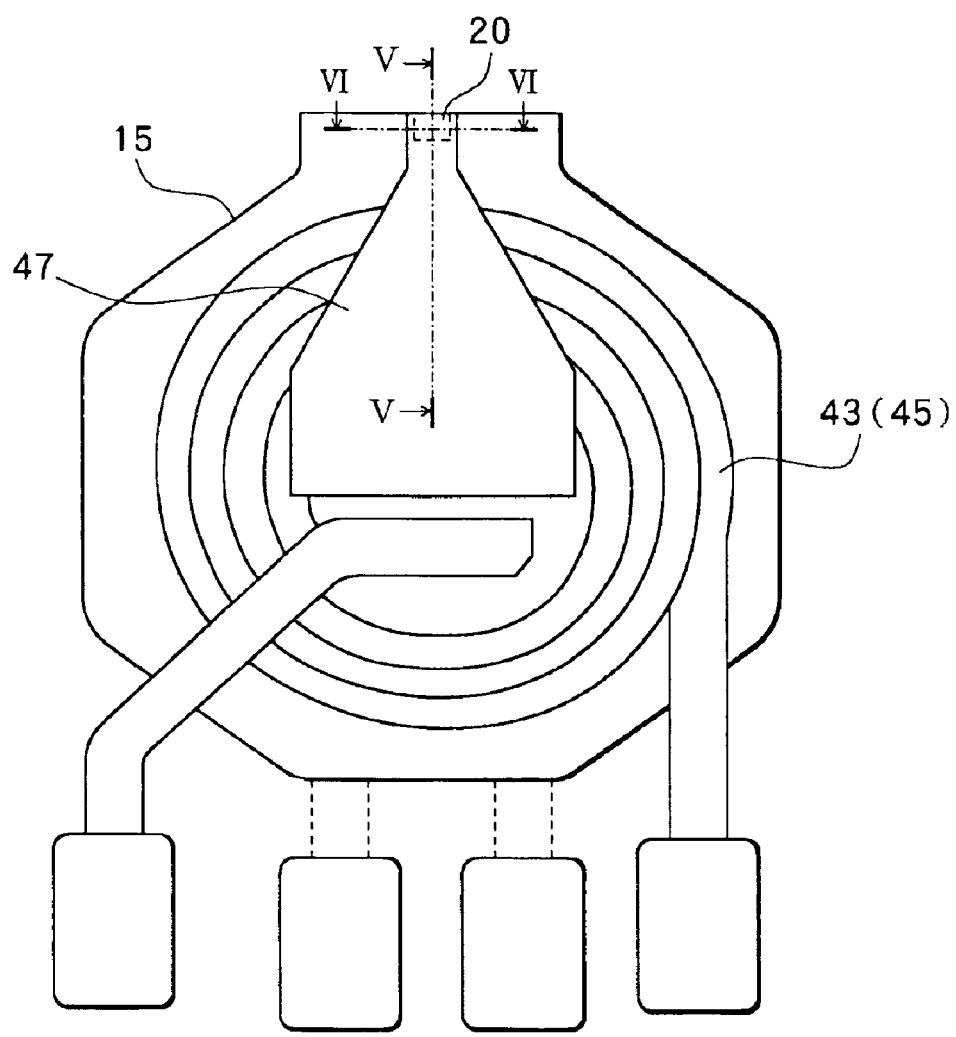
FIG. 4 is a plan view of the thin film magnetic head shown in FIG. 3, showing the structure thereof viewed from the direction of the arrow IV of FIG. 3.
Figure 4:
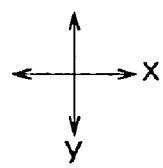
Figure 5:
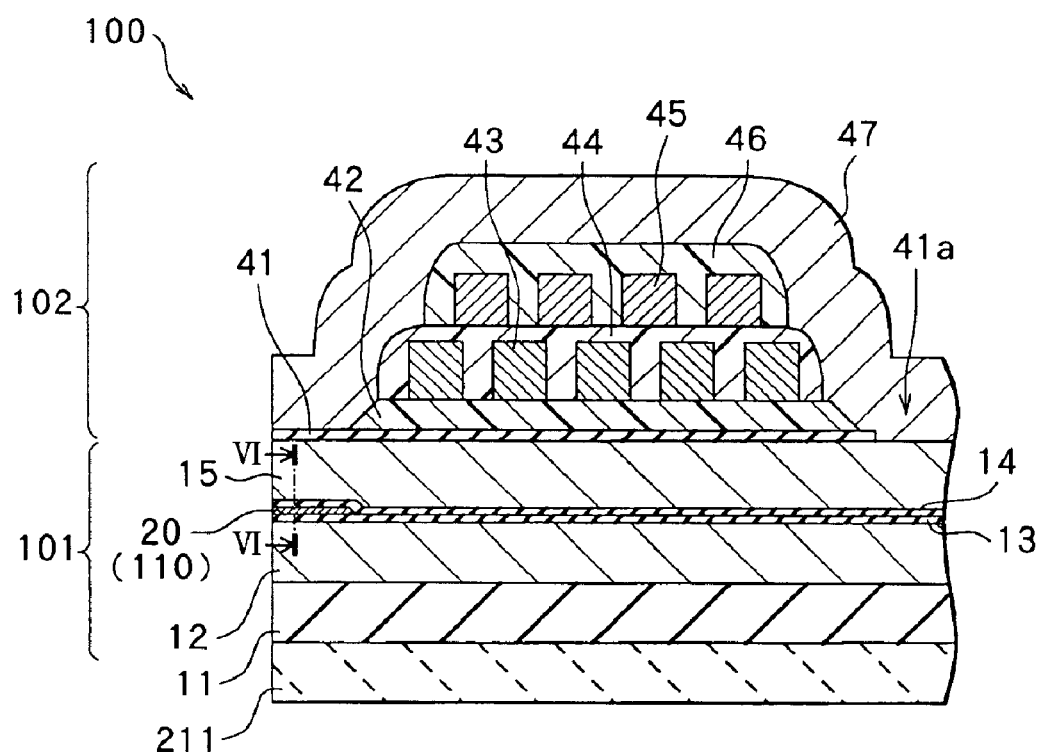
FIG. 5 is a sectional view of the thin film magnetic head shown in FIG. 3, showing the structure thereof viewed from the direction of the arrows along the line V—V of FIG. 4.
Figure 6:
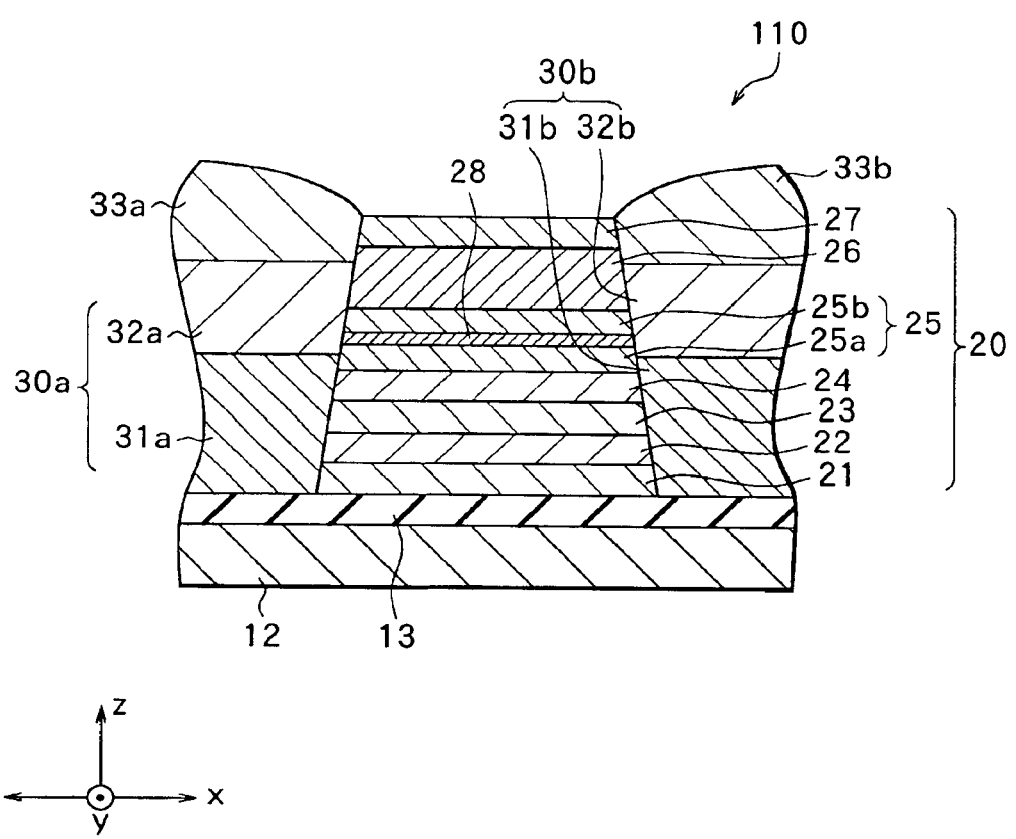
FIG. 6 is a sectional view of the thin film magnetic head shown in FIG. 3, showing the structure thereof viewed from the direction of the arrows along the line VI—VI of FIG. 4, i.e., the structure thereof viewed from the direction of the arrows along the line VI—VI of FIG. 5.
Figure 7:
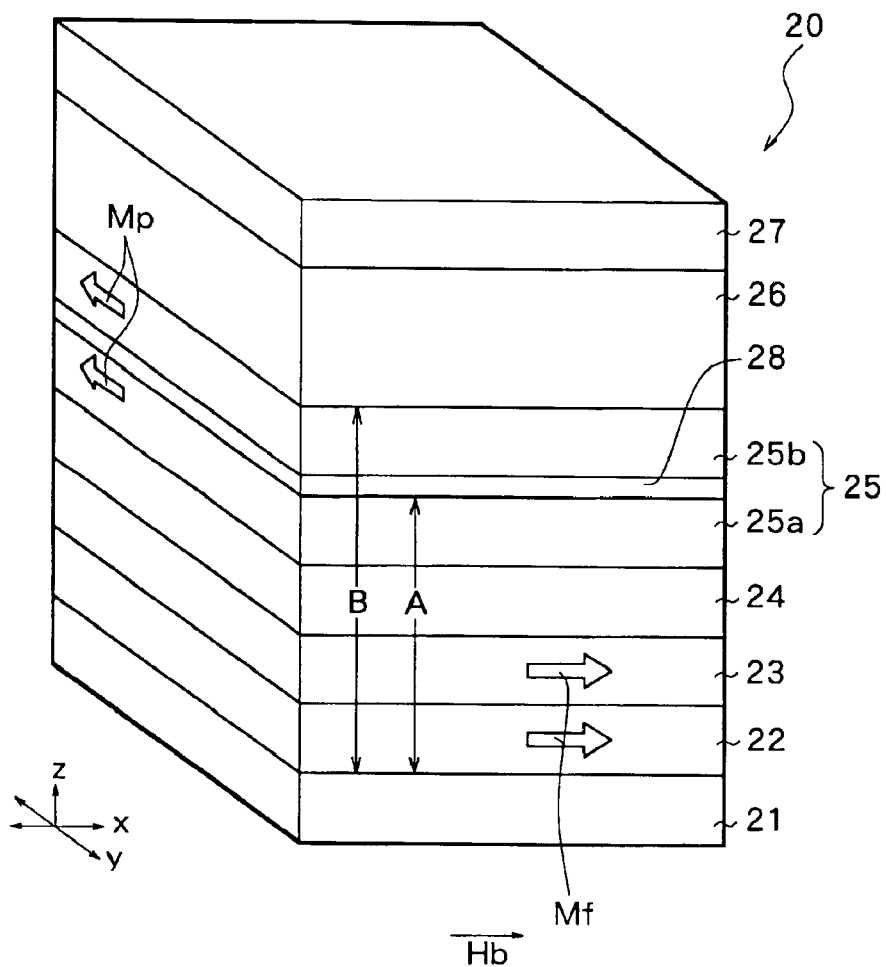
FIG. 7 is a perspective view of a structure of a stack of the magnetic transducer shown in FIG. 6.

FIG. 3 is an exploded view of the structure of the thin film magnetic head 100. FIG. 4 shows a planar structure viewed from the direction of the arrow IV of FIG. 3. FIG. 5 shows a sectional structure viewed from the direction of the arrows along the line V—V of FIG. 4. FIG. 6 shows a sectional structure viewed from the direction of the arrows along the line VI—VI of FIG. 4, i.e., the direction of the arrows along the line VI—VI of FIG. 5. FIG. 7 shows a part of the structure shown in FIG. 6. The thin film magnetic head 100 has an integral structure comprising a reproducing head 101 for reproducing magnetic information recorded on the magnetic recording medium 300 and a recording head 102 for recording magnetic information on the track line of the magnetic recording medium 300.

As shown in FIGS. 3 and 5, for example, the reproducing head 101 has a stacked structure comprising an insulating layer 11, a bottom shield layer 12, a bottom shield gap layer 13, a top shield gap layer 14 and a top shield layer 15, which are stacked in this order on the base 211 close to the air bearing surface 211a. For example, the insulating layer 11 is 2 $\mu$m to 10 $\mu$m in thickness along the direction of stack (hereinafter referred to as a thickness) and is made of $Al_2O_3$ (aluminum oxide). For example, the bottom shield layer 12 is 1 $\mu$m to 3 $\mu$m in thickness and is made of a magnetic material such as NiFe (nickel-iron alloy). For example, the bottom shield gap layer 13 and the top shield gap layer 14 are each 10 nm to 100 nm in thickness and are made of $Al_2O_3$ or AlN (aluminum nitride). For example, the top shield layer 15 is 1 $\mu$m to 4 $\mu$m in thickness and is made of a magnetic material such as NiFe. The top shield layer 15 also functions as a bottom pole of the recording head 102.

An MR element 110 including a stack 20 comprising a spin valve film is sandwiched in between the bottom shield gap layer 13 and the top shield gap layer 14. The reproducing head 101 reads out information recorded on the magnetic recording medium 300 by utilizing electrical resistance of the stack 20 changing according to a signal magnetic field from the magnetic recording medium 300.

For example, as shown in FIGS. 6 and 7, the stack 20 has a stacked structure comprising an underlayer 21, a first soft magnetic layer 22, a second soft magnetic layer 23, a nonmagnetic layer 24, a ferromagnetic layer 25, an antiferromagnetic layer 26 and a capping layer 27, which are stacked in this order on the bottom shield gap layer 13. For example, the underlayer 21 is 5 nm in thickness and is made of Ta (tantalum).

For example, the first soft magnetic layer 22 is 1 nm to 8 nm in thickness and is made of a magnetic material containing at least Ni in a group consisting of Ni, Co, Fe, Ta, Cr, Rh, Mo and Nb. Specifically, it is preferable that the first soft magnetic layer 22 is made of $[Ni_xCo_yFe_{100-(x+y)}]_{100-z}M_{Iz}$, where $M_I$ represents at least one of Ta, Cr, Rh, Mo and Nb, and x, y and z are within a range of $75 \leq x \leq 90$, $0 \leq y \leq 15$ and $0 \leq z \leq 15$ in units of atom %, respectively.

For example, the second soft magnetic layer 23 is 0.5 nm to 3 nm in thickness and is made of a magnetic material containing at least Co in a group consisting of Ni, Co and Fe. Specifically, it is preferable that the second soft magnetic layer 23 is made of $Co_xFe_yNi_{100-(x+y)}$ having the (111) plane oriented in the direction of stack, where x and y are within a range of $70 \leq x \leq 100$ and $0 \leq y \leq 25$ in units of atom %, respectively. Both of the first soft magnetic layer 22 and the second soft magnetic layer 23 form a soft magnetic layer sometimes called a free layer. The orientation of the magnetic field of the soft magnetic layer changes according to the signal magnetic field from the magnetic recording medium 300. The thickness of the soft magnetic layer, i.e., the thickness of the first soft magnetic layer 22 plus the thickness of the second soft magnetic layer 23 is 3 nm to 8 nm, for example.

For example, the nonmagnetic layer 24 is 1.8 nm to 3.0 nm in thickness and is made of a nonmagnetic material containing 80 wt % or more of at least one element in a group consisting of Cu, Au (gold) and Ag (silver).

For example, the ferromagnetic layer 25 is 2 nm to 4.5 nm in thickness and is made of a magnetic material containing at least Co in a group consisting of Co and Fe. Preferably, the ferromagnetic layer 25 is made of a magnetic material having the (111) plane oriented in the direction of stack. The ferromagnetic layer 25 is sometimes called a pinned layer, and the orientation of magnetization thereof is fixed by exchange coupling on an interface between the ferromagnetic layer 25 and the antiferromagnetic layer 26. In the embodiment, the orientation of the magnetization is fixed in the y-direction.

For example, the antiferromagnetic layer 26 is 5 nm to 30 nm in thickness and is made of an antiferromagnetic material containing at least one element $M_{II}$ in a group consisting of Pt, Ru (ruthenium), Rh, Pd (palladium), Ni, Au, Ag, Cu, Ir, Cr and Fe, and manganese (Mn). Preferably, the percentage of content of Mn is from 45 atom % to 95 atom % inclusive, and the percentage of content of the other element $M_{II}$ is from 5 atom % to 65 atom % inclusive. Antiferromagnetic materials include a non-heat-treatment type antiferromagnetic material which exhibits antiferromagnetism without heat treatment and induces an exchange coupling magnetic field between the antiferromagnetic material and a ferromagnetic material, and a heat-treatment type antiferromagnetic material which exhibits antiferromagnetism with heat treatment. The antiferromagnetic layer 26 may be made of either the non-heat-treatment type antiferromagnetic material or the heat-treatment type antiferromagnetic material.

Non-heat-treatment type antiferromagnetic materials include Mn alloy having γ-phase, and so on. Specifically, RuRhMn (ruthenium-rhodium-manganese alloy), FeMn (iron-manganese alloy), IrMn (iridium-manganese alloy) and the like are included. Heat-treatment type antiferromagnetic materials include Mn alloy having regular crystal structures, and so on. Specifically, PtMn (platinum-manganese alloy), NiMn (nickel-manganese alloy), PtRhMn (platinum-rhodium-manganese alloy) and the like are included. For example, the capping layer 27 is 5 nm in thickness and is made of Ta.

In the stack 20, the ferromagnetic layer 25 is divided into a bottom layer 25a and a top layer 25b in the direction of stack. A interlayer 28 corresponding to a specific example of "an interlayer" of the invention is provided between the bottom layer 25a and the top layer 25b, i.e., in the ferromagnetic layer 25. When a sense current passes through the stack 20, the interlayer 28 reflects at least some electrons and thus limits a route for the electrons, thereby increasing the rate of resistance change of the stack 20. The interlayer 28 has higher electrical resistance than the electrical resistance of the ferromagnetic layer 25. The interlayer 28 also has magnetism, and thus the bottom layer 25a is magnetically integrated with the top layer 25b. In other words, when the orientation of magnetization of the top layer 25b is fixed by exchange coupling on an interface between the top layer 25b and the antiferromagnetic layer 26, the orientation of magnetization of the bottom layer 25a is also fixed in the same direction.

For example, the interlayer 28 is made of a material having higher electrical resistance than the electrical resistance of a material of the ferromagnetic layer 25, and thus the interlayer 28 has higher electrical resistance than the electrical resistance of the ferromagnetic layer 25. Preferably, the interlayer 28 contains at least one of oxide, nitride and nitride oxide, because these materials are magnetically stable and can reduce a variation in output. Preferably, the interlayer 28 contains at least one of elements which the ferromagnetic layer 25 is made of. The ferromagnetic layer 25 is partly oxidized, nitrided, or oxidized and nitrided, whereby a good interlayer 28 can be easily obtained. Preferably, the interlayer 28 contains, as an additive, at least one element in a group consisting of Mn, Cr, Ni, Cu, Rh, Ir and Pt, because these elements can improve thermal stability. Specifically, it is preferable that the interlayer 28 contains at least Co in a group consisting of Ni, Co and Fe, at least one element in a group consisting of O and N, and at least one element in a group consisting of Mn, Cr, Ni, Cu, Rh, Ir and Pt.

Preferably, the thickness of the interlayer 28 is from 0.5 nm to 1 nm inclusive, for example. Too thick a interlayer 28 causes a reduction in magnetic coupling between the bottom layer 25a and the top layer 25b, and consequently a high rate of resistance change cannot be obtained. Too thin a interlayer 28 cannot sufficiently limit the route for the electrons, and consequently a high rate of resistance change cannot be obtained.

Magnetic domain control films 30a and 30b are provided on both sides of the stack 20, i.e., both sides along the direction perpendicular to the direction of stack. Thus, the respective magnetizations of the first soft magnetic layer 22 and the second soft magnetic layer 23 are oriented in the same direction, so that a single magnetic domain is formed and thus so-called Barkhausen noise is prevented. The magnetic domain control film 30a has a stacked structure comprising a magnetic domain controlling ferromagnetic film 31a and a magnetic domain controlling antiferromagnetic film 32a, which are stacked in this order on the bottom shield gap layer 13. The magnetic domain control film 30b has the same structure as the magnetic domain control film 30a has. The orientations of magnetizations of the magnetic domain controlling ferromagnetic films 31a and 31b are fixed by exchange coupling on the interfaces between the magnetic domain controlling ferromagnetic films 31a and 31b and the magnetic domain controlling antiferromagnetic films 32a and 32b. Thus, for example, as shown in FIG. 7, a bias magnetic field Hb to be applied to the first soft magnetic layer 22 and the second soft magnetic layer 23 is generated in the x-direction near the magnetic domain controlling ferromagnetic films 31a and 31b.

The magnetic domain controlling ferromagnetic films 31a and 31b are each 10 nm to 50 nm in thickness, for example. The magnetic domain controlling ferromagnetic films 31a and 31b are made of, for example, a magnetic material made of NiFe, or Ni, Fe and Co. In this case, the magnetic domain controlling ferromagnetic films 31a and 31b may be formed of a stacked film of NiFe and Co. For example, the magnetic domain controlling antiferromagnetic films 32a and 32b are each 5 nm to 30 nm in thickness and are made of an antiferromagnetic material. Although the antiferromagnetic material may be either the non-heat-treatment type antiferromagnetic material or the heat-treatment type antiferromagnetic material, the non-heat-treatment type antiferromagnetic material is preferable. A hard magnetic material (a hard magnet) may be used as the magnetic domain control films 30a and 30b. In this case, a stacked film of a TiW (titanium-tungsten alloy) layer and a CoPt (cobalt-platinum alloy) layer, a stacked film of a TiW layer and a CoCrPt (cobalt-chromium-platinum alloy) layer, or the like can be used.

Lead layers 33a and 33b, which are formed of a stacked film of Ta and Au, a stacked film of TiW and Ta, a stacked film of TiN (titanium nitride) and Ta, or the like, are provided on the magnetic domain control films 30a and 30b, respectively, so that a current can be passed through the stack 20 through the magnetic domain control films 30a and 30b.

For example, as shown in FIGS. 3 and 5, the recording head 102 has a write gap layer 41 of 0.1 $\mu$m to 0.5 $\mu$m thick formed of an insulating film such as $Al_2O_3$ on the top shield layer 15. The write gap layer 41 has an opening 41a at the position corresponding to the center of thin film coils 43 and 45 to be described later. The thin film coils 43 of 1 $\mu$m to 3 $\mu$m thick and a photoresist layer 44 for coating the thin film coils 43 are formed on the write gap layer 41 with a photoresist layer 42 having a thickness of 1.0 $\mu$m to 5.0 $\mu$m for determining a throat height in between. The thin film coils 45 of 1 $\mu$m to 3 $\mu$m thick and a photoresist layer 46 for coating the thin film coils 45 are formed on the photoresist layer 44. In the embodiment, the description is given with regard to an example in which two thin film coil layers are stacked. However, the number of thin film coil layers may be one, or three or more.

A top pole 47 of about 3 $\mu$m thick made of a magnetic material having high saturation magnetic flux density, such as NiFe or FeN (iron nitride), is formed on the write gap layer 41 and the photoresist layers 42, 44 and 46. The top pole 47 is in contact with and magnetically coupled to the top shield layer 15 through the opening 41a of the write gap layer 41 located at the position corresponding to the center of the thin film coils 43 and 45. Although not shown in FIGS. 3 to 6, an overcoat layer (an overcoat layer 48 in FIG. 13B) of 20 $\mu$m to 30 $\mu$m thick made of, for example, $Al_2O_3$ is formed on the top pole 47 so as to coat the overall surface. Thus, the recording head 102 generates a magnetic flux between the bottom pole, i.e., the top shield layer 15 and the top pole 47 by a current passing through the thin film coils 43 and 45 and magnetizes the magnetic recording medium 300 by the magnetic flux generated near the write gap layer 41, thereby recording information on the magnetic recording medium 300.

Operation of MR Element and Thin Film Magnetic Head

Next, a reproducing operation of the MR element 110 and the thin film magnetic head 100 configured as described above will be described with main reference to FIGS. 6 and 7.

In the thin film magnetic head 100, the reproducing head 101 reads out information recorded on the magnetic recording medium 300. In the reproducing head 101, for example, the orientation of magnetization Mp of the ferromagnetic layer 25 is fixed in the y-direction by the exchange coupling magnetic field generated by exchange coupling on the interface between the ferromagnetic layer 25 and the antiferromagnetic layer 26 of the stack 20. Although the ferromagnetic layer 25 is divided into the bottom layer 25a and the top layer 26b by the interlayer 28, the interlayer 28 has magnetism and thus the orientations of the magnetizations Mp of the bottom layer 25a and the top layer 25b are integrally fixed. Magnetizations Mf of the first soft magnetic layer 22, the second soft magnetic layer 23 and the interlayer 28 are oriented in the direction of the bias magnetic field Hb (the x-direction) by the bias magnetic field Hb generated by the magnetic domain control films 30a and 30b. The orientation of the bias magnetic field Hb is substantially perpendicular to the orientation of the magnetization Mp of the ferromagnetic layer 25.

For reading out information, a sense current that is a stationary electric current is passed through the stack 20 in, for example, the direction of the bias magnetic field Hb through the lead layers 33a and 33b. At this time, most of the electrons move mainly through the nonmagnetic layer 24 between the first soft magnetic layer 22 having low electrical resistance and the ferromagnetic layer 25. However, in the embodiment, the electrical resistance of the interlayer 28 is higher than the electrical resistance of the bottom layer 25a of the ferromagnetic layer 25. Thus, at least some of the electrons moving from the bottom layer 25a toward the interlayer 28 are reflected by the surface of the interlayer 28. That is, the current passes mainly through the first soft magnetic layer 22, the second soft magnetic layer 23, the nonmagnetic layer 24 and the bottom layer 25a of the ferromagnetic layer 25.

The orientations of the magnetizations Mf of the first soft magnetic layer 22 and the second soft magnetic layer 23 change under the signal magnetic field from the magnetic recording medium 300. The orientation of the magnetization Mp of the ferromagnetic layer 25 does not change even under the signal magnetic field from the magnetic recording medium 300 because the orientation is fixed by the antiferromagnetic layer 26. When the orientations of the magnetizations Mf of the first soft magnetic layer 22 and the second soft magnetic layer 23 change, the current passing through the stack 20 is subjected to resistance according to a relative angle between the orientations of the magnetizations Mf of the first soft magnetic layer 22 and the second soft magnetic layer 23 and the orientation of the magnetization Mp of the ferromagnetic layer 25. This is caused by a phenomenon called "spin-dependent scattering", which refers to that the degree of scattering of electrons on the interface between the nonmagnetic layer and the magnetic layer depends on the direction of magnetization of the magnetic layer. The amount of change in the resistance of the stack 20 is detected as the amount of change in voltage, and thus information recorded on the magnetic recording medium 300 is read out.

When the interlayer 28 is not provided, a main path for the electrons in the stack 20 is in a range indicated by the arrow B in FIG. 7, i.e., a range including the first soft magnetic layer 22, the second soft magnetic layer 23, the nonmagnetic layer 24 and the ferromagnetic layer 25. On the other hand, in the embodiment, the interlayer 28 is provided in the first soft magnetic layer 22. Thus, the main path for the electrons is limited to a range indicated by the arrow A in FIG. 7, i.e., a range including the first soft magnetic layer 22, the second soft magnetic layer 23, the nonmagnetic layer 24 and the bottom layer 25a. Furthermore, the electrons are reflected by the interlayer 28, with spin kept. Therefore, the electrons intensively move onto the interface between the nonmagnetic layer and the magnetic layer, and thus the number of electrons for contributing to "spin-dependent scattering" increases. As a consequence, the rate of resistance change increases.

Since the interlayer 28 contains, as the additive, at least one element in a group consisting of Mn, Cr, Ni, Cu, Rh, Ir and Pt, heat deterioration in the stack 20 can be prevented. Furthermore, the thickness of the interlayer 28 is from 0.5 nm to 1.0 nm inclusive, whereby a high rate of resistance change can be obtained with the bottom layer 25a magnetically coupled to the top layer 25b.

Method of Manufacturing MR Element and Thin Film Magnetic Head

Next, a method of manufacturing the MR element 110 and the thin film magnetic head 100 will be described with reference to FIG. 8 to FIGS. 13A and 13B. FIGS. 8, 12A and 12B and 13A and 13B show a sectional structure taken along the line V—V of FIG. 4. FIGS. 9A to 9C to FIGS. 11A and 11B show a sectional structure taken along the line VI—VI of FIG. 4.

Figure 8:
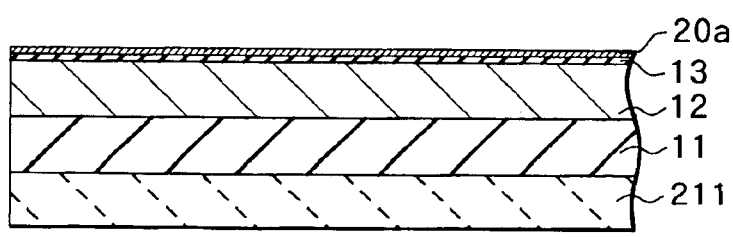
FIG. 8 is a sectional view for describing a step of a method of manufacturing the thin film magnetic head shown in FIG. 3.

In the manufacturing method according to the embodiment, first, as shown in FIG. 8, for example, the insulating layer 11 is formed on one side of the base 211 made of $Al_2O_3$—TiC by sputtering using the material mentioned in the description of the structure. Then, the bottom shield layer 12 is formed on the insulating layer 11 by, for example, plating using the material mentioned in the description of the structure. Subsequently, the bottom shield gap layer 13 is formed on the bottom shield layer 12 by, for example, sputtering using the material mentioned in the description of the structure. After that, a stacked film 20a for forming the stack 20 is formed on the bottom shield gap layer 13.

Figure 9A:
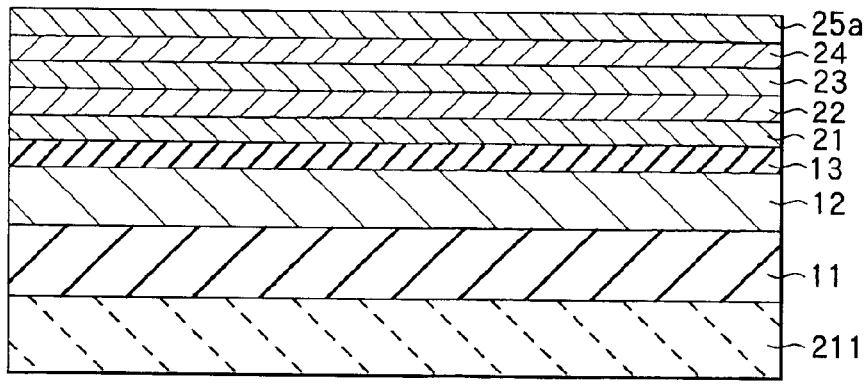
FIGS. 9A to 9C are sectional views for describing a step following the step of FIG. 8.

A step of forming the stack 20 will be described in detail. First, as shown in FIG. 9A, the underlayer 21, the first soft magnetic layer 22, the second soft magnetic layer 23, the nonmagnetic layer 24 and the bottom layer 25a of the ferromagnetic layer 25 are formed in sequence on the bottom shield gap layer 13 by, for example, sputtering using the materials mentioned in the description of the structure. The step takes place in, for example, a vacuum chamber (not shown) under vacuum at an ultimate pressure of about $1.3 \times 10^{-8}$ Pa to $3.0 \times 10^{-6}$ Pa and a deposition pressure of about $1.3 \times 10^{-3}$ Pa to 1.3 Pa.

Figure 9B:
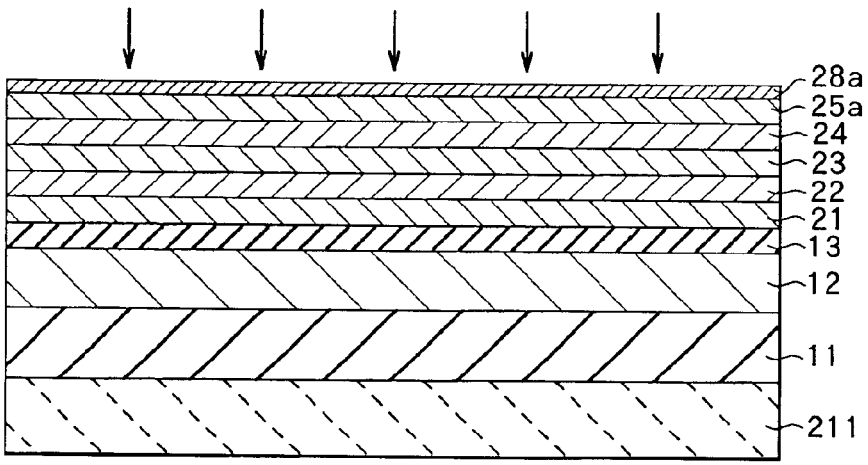

Then, as shown in FIG. 9B, a metal layer 28a made of at least one element in a group consisting of Mn, Cr, Ni, Cu, Rh, Ir and Pt is formed by, for example, sputtering with a thickness of about 0.2 nm on the surface of the bottom layer 25a of the ferromagnetic layer 25. The metal layer 28a does not have to coat the overall surface of the bottom layer 25a but may be shaped like an island so that the surface of the bottom layer 25a is partly exposed.

Subsequently, at least one of oxygen gas and nitrogen gas is introduced into a vacuum chamber (not shown) so that the degree of vacuum may be about $1.3 \times 10^{-3}$ Pa to $10^5$ Pa. After that, for example, the surface of the bottom layer 25a coated with the above-mentioned metal layer 28a is exposed to an atmosphere containing at least one of oxygen and nitrogen for 0.01 minute to 60 minutes. Thus, the metal layer 28a and a part of the bottom layer 25a are oxidized, nitrided, or oxidized and nitrided, so that the interlayer 28 is formed. As the interlayer 28 is formed, the bottom layer 25a becomes thinner than the first-formed bottom layer 25a. In the step of oxidation, nitriding, or oxidation and nitriding, it is more preferable that the degree of vacuum in the vacuum chamber is $1.3 \times 10^{-2}$ Pa to $2.6 \times 10^4$ Pa, or it is more preferable that the time required to expose the surface of the bottom layer 25a is 0.1 minute to 30 minutes. Under the above-mentioned conditions, the film thickness can be easily controlled and thus a good interlayer 28 can be easily obtained.

Figure 9C:
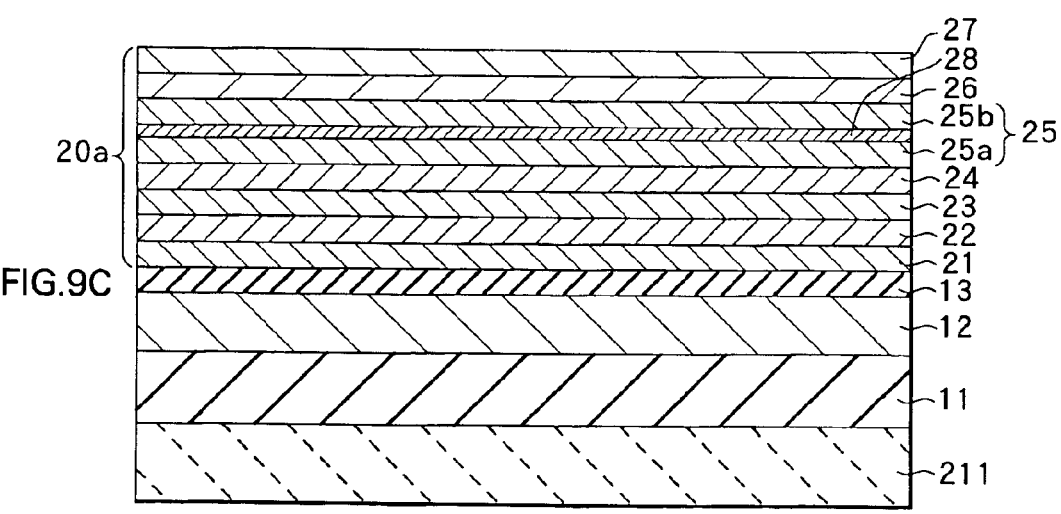

After forming the interlayer 28, for example, the pressure in the vacuum chamber (not shown) is reduced again so as to form a high vacuum in the vacuum chamber. In such a high vacuum, as shown in FIG. 9C, the top layer 25b of the ferromagnetic layer 25, the antiferromagnetic layer 26 and the capping layer 27 are formed in sequence on the interlayer 28 by sputtering using the materials mentioned in the description of the structure. Thus, the stacked film 20a is formed. To form the antiferromagnetic layer 26 by the non-heat-treatment type antiferromagnetic material, the antiferromagnetic layer 26 is formed with the magnetic field applied in the y-direction, for example. Thus, the orientation of magnetization of the ferromagnetic layer 25 is fixed in the direction y of the applied magnetic field by exchange coupling between the ferromagnetic layer 25 and the antiferromagnetic layer 26.

Figure 10A:
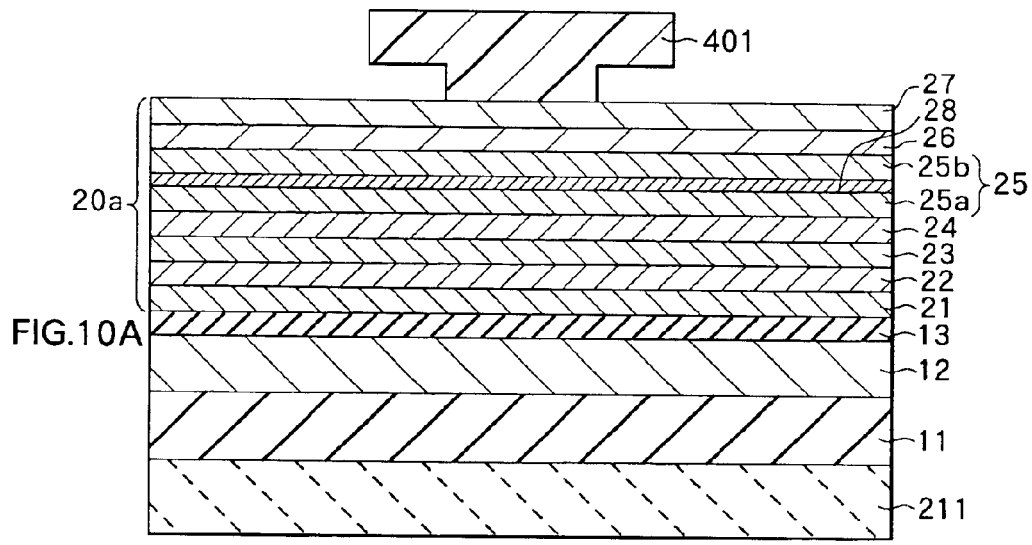
FIGS. 10A and 10B are sectional views for describing a step following the step of FIGS. 9A to 9C.
Figure 10B:
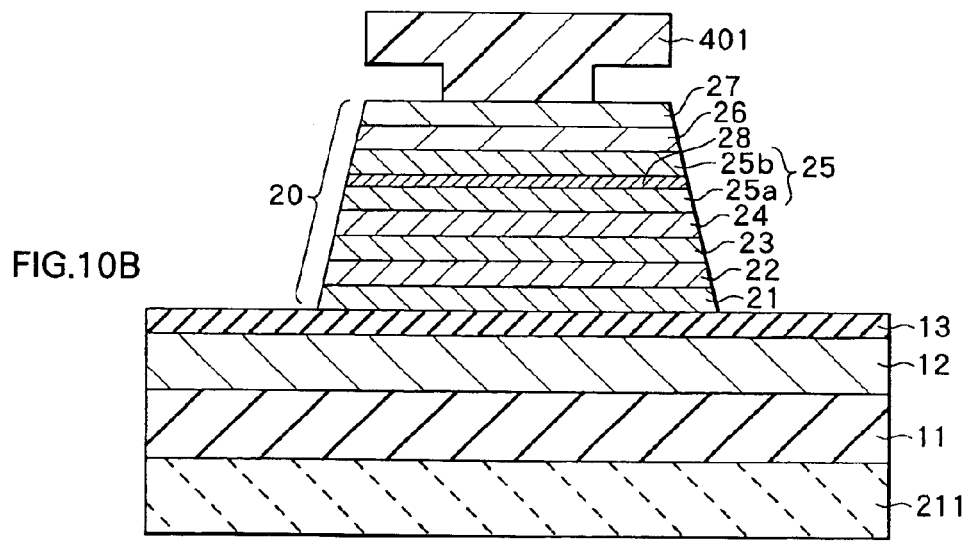

After that, as shown in FIG. 10A, for example, a photoresist film 401 is selectively formed on the capping layer 27 in a region in which the stack 20 is to be formed. Preferably, for example, the photoresist film 401 is T-shaped in cross section by forming a trench in the interface between the photoresist film 401 and the capping layer 27 so as to facilitate lift-off procedures to be described later. After forming the photoresist film 401, the stacked film 20a (i.e., the capping layer 27, the antiferromagnetic layer 26, the interlayer 28, the ferromagnetic layer 25, the nonmagnetic layer 24, the second soft magnetic layer 23, the first soft magnetic layer 22 and the underlayer 21) is etched by, for example, ion milling using the photoresist film 401 as a mask. Thus, the stack 20 is formed as shown in FIG. 10B.

Figure 11A:
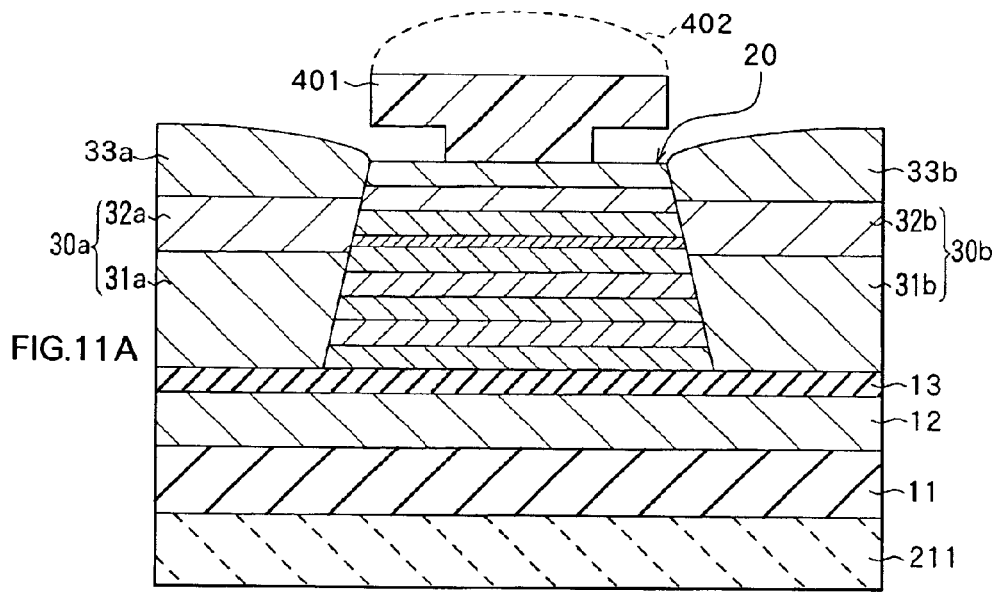
FIGS. 11A and 11B are sectional views for describing a step following the step of FIGS. 10A and 10B.

After forming the stack 20, as shown in FIG. 11A, the magnetic domain controlling ferromagnetic films 31a and 31b and the magnetic domain controlling antiferromagnetic films 32a and 32b are formed in sequence on both sides of the stack 20 by sputtering, for example. To form the magnetic domain controlling antiferromagnetic films 32a and 32b by the non-heat-treatment type antiferromagnetic material, the magnetic domain controlling antiferromagnetic films 32a and 32b are formed with the magnetic field applied in the x-direction, for example. Thus, the orientations of magnetizations of the magnetic domain controlling ferromagnetic films 31a and 31b are fixed in the direction x of the applied magnetic field by exchange coupling between the magnetic domain controlling ferromagnetic films 31a and 31b and the magnetic domain controlling antiferromagnetic films 32a and 32b.

After forming the magnetic domain control films 30a and 30b, as shown in FIG. 11A, the lead layers 33a and 33b are formed on the magnetic domain controlling antiferromagnetic films 32a and 32b, respectively, by sputtering, for example. After that, the photoresist film 401 and a deposit 402 stacked thereon (the materials of the magnetic domain controlling ferromagnetic film, the magnetic domain controlling antiferromagnetic film and the lead layer) are removed by lift-off procedures, for example.

Figure 11B:
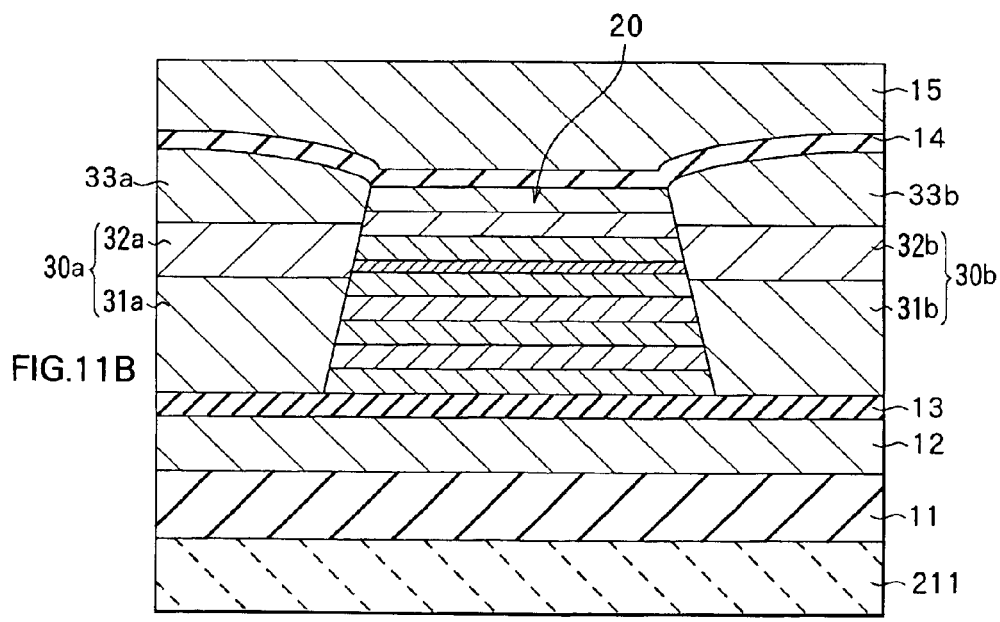
Figure 12A:
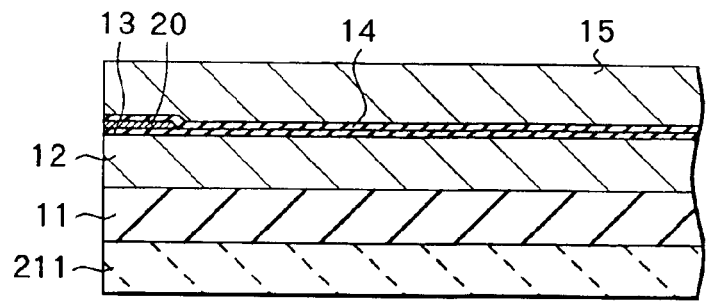
FIGS. 12A and 12B are sectional views for describing a step following the step of FIGS. 11A and 11B.

After lift-off procedures, as shown in FIGS. 11B and 12A, the top shield gap layer 14 is formed by, for example, sputtering using the material mentioned in the description of the structure so as to coat the bottom shield gap layer 13 and the stack 20. Thus, the stack 20 is sandwiched in between the bottom shield gap layer 13 and the top shield gap layer 14. After that, the top shield layer 15 is formed on the top shield gap layer 14 by, for example, sputtering using the material mentioned in the description of the structure.

Figure 12B:
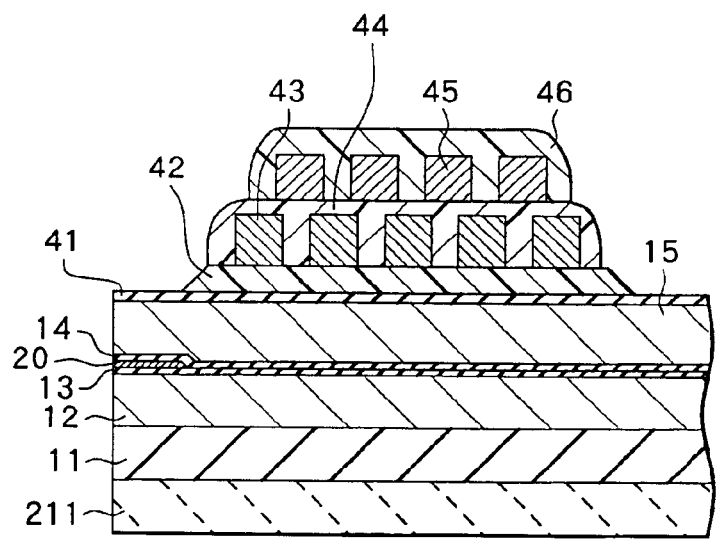

After forming the top shield layer 15, as shown in FIG. 12B, the write gap layer 41 is formed on the top shield layer 15 by, for example, sputtering using the material mentioned in the description of the structure. The photoresist layer 42 is formed into a predetermined pattern on the write gap layer 41. After forming the photoresist layer 42, the thin film coils 43 are formed on the photoresist layer 42 by using the material mentioned in the description of the structure. The photoresist layer 44 is formed into a predetermined pattern so as to coat the thin film coils 43. After forming the photoresist layer 44, the thin film coils 45 are formed on the photoresist layer 44 by using the material mentioned in the description of the structure. The photoresist layer 46 is formed into a predetermined pattern so as to coat the thin film coils 45.

Figure 13A:
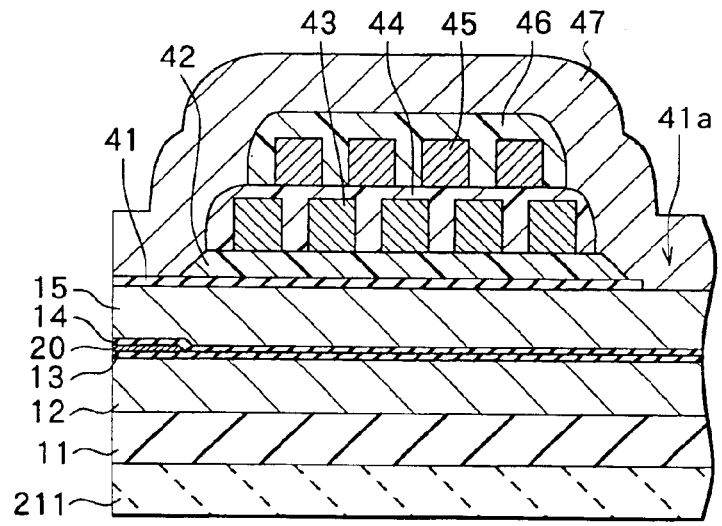
FIGS. 13A and 13B are sectional views for describing a step following the step of FIGS. 12A and 12B.
Figure 13B:
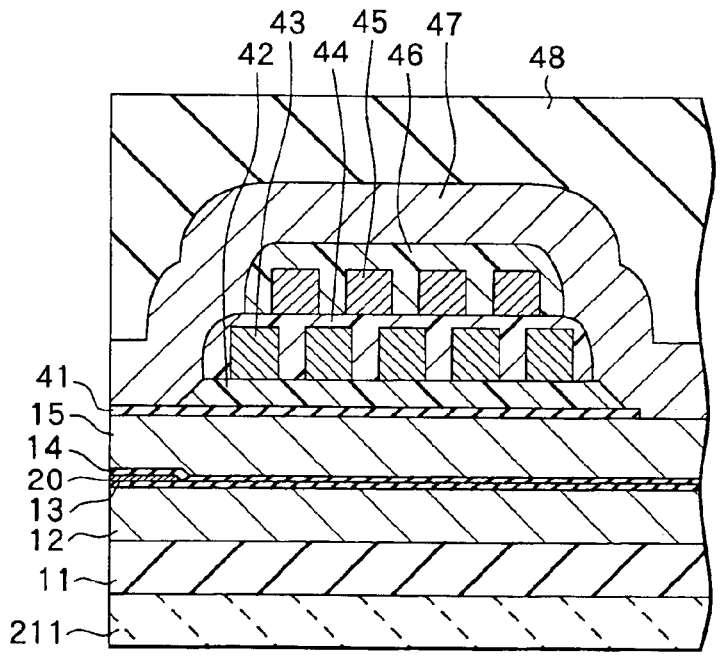

After forming the photoresist layer 46, as shown in FIG. 13A, for example, the write gap layer 41 is partly etched at the position corresponding to the center of the thin film coils 43 and 45, whereby the opening 41a for forming a magnetic path is formed. After that, for example, the top pole 47 is formed on the write gap layer 41, the opening 41a and the photoresist layers 42, 44 and 46 by use of the material mentioned in the description of the structure. After forming the top pole 47, for example, the write gap layer 41 and the top shield layer 15 are selectively etched by ion milling using the top pole 47 as a mask. After that, as shown in FIG. 13B, the overcoat layer 48 is formed on the top pole 47 by use of the material mentioned in the description of the structure.

After forming the overcoat layer 48, a process of antiferromagnetizing for fixing the orientations of magnetic fields of the antiferromagnetic layer 26 and the magnetic domain controlling ferromagnetic films 31a and 31b takes place, for example, to form the antiferromagnetic layer 26 of the stack 20 and the magnetic domain controlling ferromagnetic films 31a and 31b by the heat-treatment type antiferromagnetic material. Specifically, when a blocking temperature (a temperature at which exchange coupling can occur on the interface) of the antiferromagnetic layer 26 and the ferromagnetic layer 25 is higher than the blocking temperature of the magnetic domain controlling antiferromagnetic films 32a and 32b and the magnetic domain controlling ferromagnetic films 31a and 31b, the thin film magnetic head 100 is heated at the blocking temperature of the antiferromagnetic layer 26 and the ferromagnetic layer 25 with the magnetic field applied in, for example, the y-direction by utilizing a magnetic field generating apparatus or the like. Thus, the orientation of magnetization of the ferromagnetic layer 25 is fixed in the direction y of the applied magnetic field by exchange coupling between the ferromagnetic layer 25 and the antiferromagnetic layer 26. Subsequently, the thin film magnetic head 100 is cooled to the blocking temperature of the magnetic domain controlling antiferromagnetic films 32a and 32b and the magnetic domain controlling ferromagnetic films 31a and 31b, whereby the magnetic field is applied in the x-direction, for example. Thus, the orientations of magnetizations of the magnetic domain controlling ferromagnetic films 31a and 31b are fixed in the direction x of the applied magnetic field by exchange coupling between the magnetic domain controlling ferromagnetic films 31a and 31b and the magnetic domain controlling antiferromagnetic films 32a and 32b.

When the blocking temperature of the antiferromagnetic layer 26 and the ferromagnetic layer 25 is lower than the blocking temperature of the magnetic domain controlling antiferromagnetic films 32a and 32b and the magnetic domain controlling ferromagnetic films 31a and 31b, the process is the reverse of the above-mentioned procedure. Heat treatment is not necessary to form the antiferromagnetic layer 26 or the magnetic domain controlling antiferromagnetic films 32a and 32b by the non-heat-treatment type antiferromagnetic material. In the embodiment, heat treatment for antiferromagnetizing takes place after forming the overcoat layer 48. After forming the ferromagnetic layer 25 and the antiferromagnetic layer 26, heat treatment may, however, take place before forming the overcoat layer 48. After forming the magnetic domain control films 30a and 30b, heat treatment may take place before forming the overcoat layer 48.

Finally, the air bearing surface is formed by, for example, machining the slider. As a result, the thin film magnetic head 100 shown in FIGS. 3 to 5 is completed.

Effects of First Embodiment

As described above, according to the embodiment, the interlayer 28 is provided in the ferromagnetic layer 25, and the interlayer 28 contains at least one element in a group consisting of Mn, Cr, Ni, Cu, Rh, Ir and Pt. Thus, the rate of resistance change of the stack 20 can be increased, and heat deterioration in the stack 20 can be prevented. Therefore, even if the stack 20 is subjected to heat treatment for a long time in the step of manufacturing the thin film magnetic head 100, the rate of resistance change decreases little and consequently a high rate of resistance change can be maintained.

The thickness of the interlayer 28 is from 0.5 nm to 1.0 nm inclusive, whereby a higher rate of resistance change can be obtained with the bottom layer 25a and the top layer 25b of the ferromagnetic layer 25 magnetically integrated with each other.

In the step of forming the interlayer 28, the metal layer 28a made of at least one element in a group consisting of Mn, Cr, Ni, Cu, Rh, Ir and Pt is formed on the surface of the bottom layer 25a of the ferromagnetic layer 25, and the metal layer 28a and a part of the ferromagnetic layer 25 are oxidized, nitrided, or oxidized and nitrided, whereby the interlayer 28 is formed. Thus, the interlayer 28 containing the additive such as Mn can be easily obtained.

Modification of First Embodiment

A modification of the first embodiment will be described with reference to FIG. 14.

Figure 14:
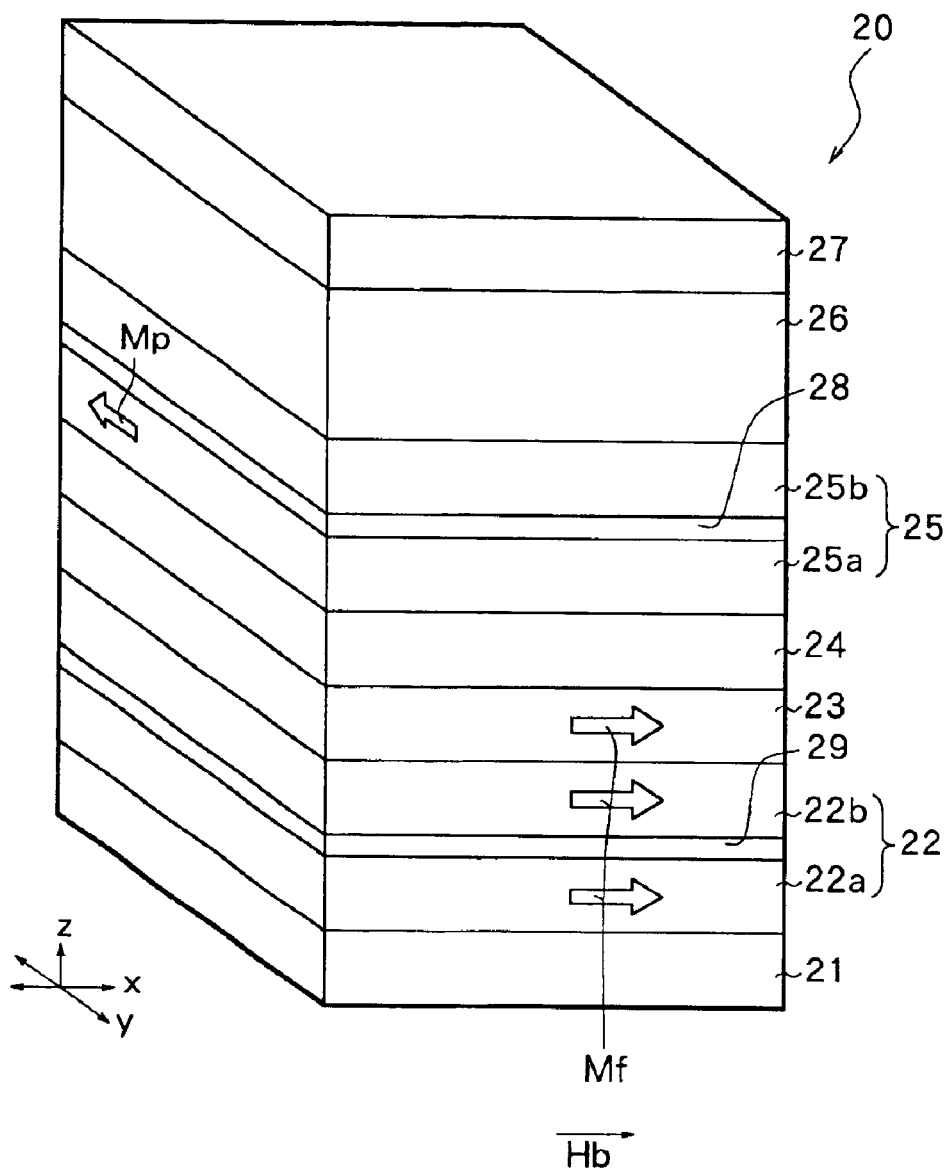
FIG. 14 is a perspective view of a structure of a stack of a magnetic transducer according to a modification of the first embodiment.

FIG. 14 shows the structure of the stack 20 of the modification. In the stack 20 of the modification, the interlayer 28 is provided in the ferromagnetic layer 25, and an interlayer 29 is provided in the first soft magnetic layer 22. In the stack 20, the first soft magnetic layer 22 is divided into a bottom layer 22a and a top layer 22b in the direction of stack, and the interlayer 29 corresponding to a specific example of "an interlayer" of the invention is provided between the bottom layer 22a and the top layer 22b, i.e., in the first soft magnetic layer 22. The interlayer 29 has higher electrical resistance than the electrical resistance of the first soft magnetic layer 22 and has magnetism so that the rate of resistance change of the stack 20 may be further increased.

Preferably, the interlayer 29 contains at least one of, for example, oxide, nitride and nitride oxide, because these materials are magnetically stable and can reduce a variation in output. Preferably, the interlayer 29 contains at least one of elements which the first soft magnetic layer 22 is made of. The first soft magnetic layer 22 is partly oxidized, nitrided, or oxidized and nitrided, whereby a good interlayer 29 can be easily obtained.

The interlayer 29 may be provided in the second soft magnetic layer 23 or between the first soft magnetic layer 22 and the second soft magnetic layer 23. To form the interlayer 29 in the second soft magnetic layer 23, it is preferable that the interlayer 29 contains at least one of elements which the second soft magnetic layer 23 is made of. The second soft magnetic layer 23 is partly oxidized, nitrided, or oxidized and nitrided, whereby a good interlayer 29 can be easily obtained. To form the interlayer 29 between the first soft magnetic layer 22 and the second soft magnetic layer 23, it is preferable that the interlayer 29 contains at least one of elements which at least one of the first soft magnetic layer 22 and the second soft magnetic layer 23 is made of. At least one of the first soft magnetic layer 22 and the second soft magnetic layer 23 is oxidized, nitrided, or oxidized and nitrided, whereby a good interlayer 29 can be easily obtained.

The interlayer 29 may contain at least one element in a group consisting of Mn, Cr, Ni, Cu, Rh, Ir and Pt, or not.

Second Embodiment

A second embodiment of the invention will be described with reference to FIG. 15. The second embodiment has the same structure as the first embodiment except that the stack has a different structure. Accordingly, the same structural elements are indicated by the same reference numerals and the detailed description thereof is omitted.

Figure 15:
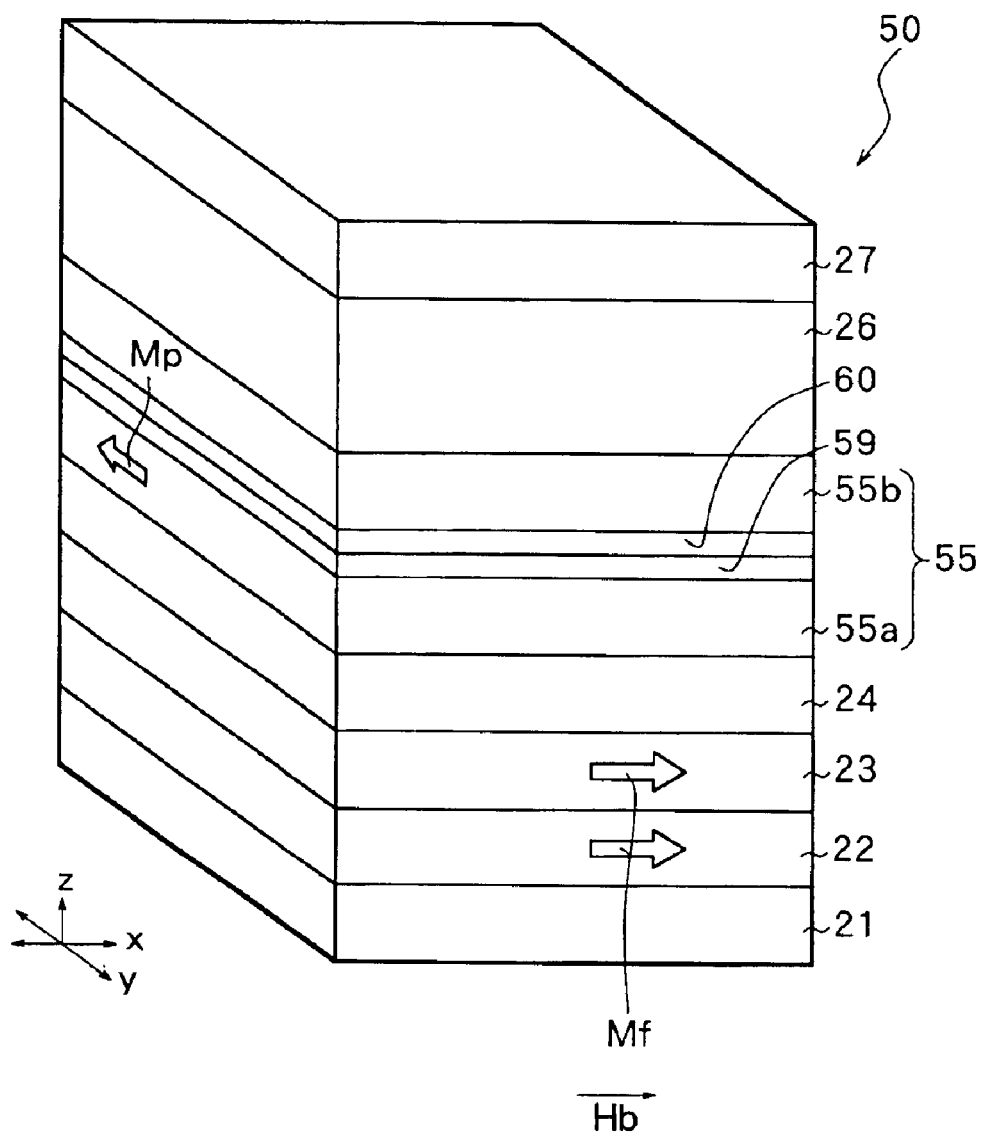
FIG. 15 is a perspective view of a structure of a stack of a magnetic transducer according to a second embodiment.

FIG. 15 shows the structure of a stack 50 of the embodiment. The stack 50 has the same structure as the stack 20 of the first embodiment, except that the interlayer 28 of the first embodiment is replaced by a ferromagnetic interlayer 59 and that an inserted layer 60 is provided adjacent to the ferromagnetic interlayer 59 and close to the antiferromagnetic layer 26. For example, the ferromagnetic interlayer 59 has the same structure as the interlayer 28 except that the ferromagnetic interlayer 59 does not have to contain at least one element in a group consisting of Mn, Cr Ni, Cu, Rh, Ir and Pt.

The inserted layer 60 is a layer for improving thermal stability of the stack 50 and contains at least one element in a group consisting of Mn, Cr, Ni, Cu, Rh, Ir and Pt. The inserted layer 60 corresponds to a specific example of "a thermal stabilization layer" of the invention. Desirably, the thickness of the inserted layer 60 is, for example, more than 0.03 nm and less than 0.6 nm. When the thickness of the inserted layer 60 is 0.03 nm or less, thermal stability cannot be sufficiently improved. When the thickness of the inserted layer 60 is 0.6 nm or more, the rate of resistance change decreases.

In the embodiment of the invention, the inserted layer 60 is provided on the surface of the ferromagnetic interlayer 59 close to the antiferromagnetic layer 26. However, the inserted layer 60 may be provided on the surface of the ferromagnetic interlayer 59 close to the nonmagnetic layer 24, or the inserted layer 60 may be provided on both the surfaces of the ferromagnetic interlayer 59. In the embodiment, the inserted layer 60 is adjacent to the ferromagnetic interlayer 59. However, the inserted layer 60 may be located at a distance from the ferromagnetic interlayer 59. In other words, the inserted layer 60 can be provided at least either on the surface of the ferromagnetic interlayer 59 opposite to the nonmagnetic layer 24 or between the ferromagnetic interlayer 59 and the nonmagnetic layer 24.

The stack 50 can be manufactured in the following manner. First, the underlayer 21, the first soft magnetic layer 22, the second soft magnetic layer 23, the nonmagnetic layer 24 and a bottom layer 55a of a ferromagnetic layer 55 are stacked in sequence in the same manner as the first embodiment, for example. Then, the surface of the bottom layer 55a is oxidized, nitrided, or oxidized and nitrided in the same manner as the first embodiment, for example, whereby the ferromagnetic interlayer 59 is formed. Subsequently, the inserted layer 60 is formed on the ferromagnetic interlayer 59 by sputtering, for example. After that, a top layer 55b of the ferromagnetic layer 55, the antiferromagnetic layer 26 and the capping layer 27 are formed in sequence on the inserted layer 60 in the same manner as the first embodiment, for example. Thus, the stack 50 shown in FIG. 15 is obtained.

As described above, according to the embodiment of the invention, the stack comprises the inserted layer 60 containing at least one element in a group consisting of Mn, Cr, Ni, Cu, Rh, Ir and Pt. Therefore, heat deterioration can be prevented similarly to the first embodiment.

The thickness of the ferromagnetic interlayer 59 is more than 0.03 nm and less than 0.6 nm, whereby heat deterioration can be prevented with the rate of resistance change kept high.

When the inserted layer 60 contains a plurality of elements in a group consisting of Mn, Cr, Ni, Cu, Rh, Ir and Pt, the inserted layer 60 may have a stacked structure comprising a plurality of layers.

Figure 16:
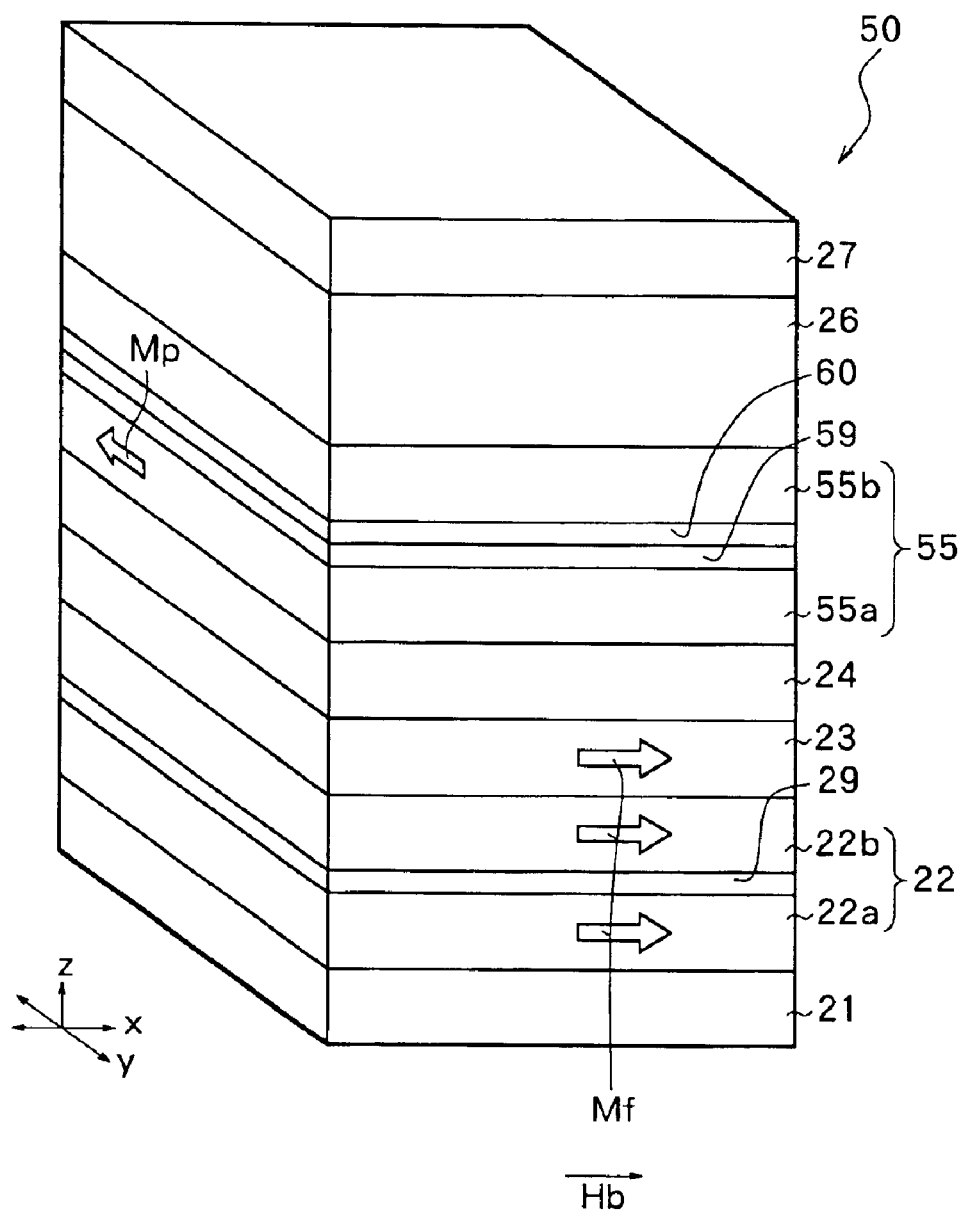
FIG. 16 is a perspective view of another example of the structure of the stack of the magnetic transducer according to the second embodiment.
Figure 17:
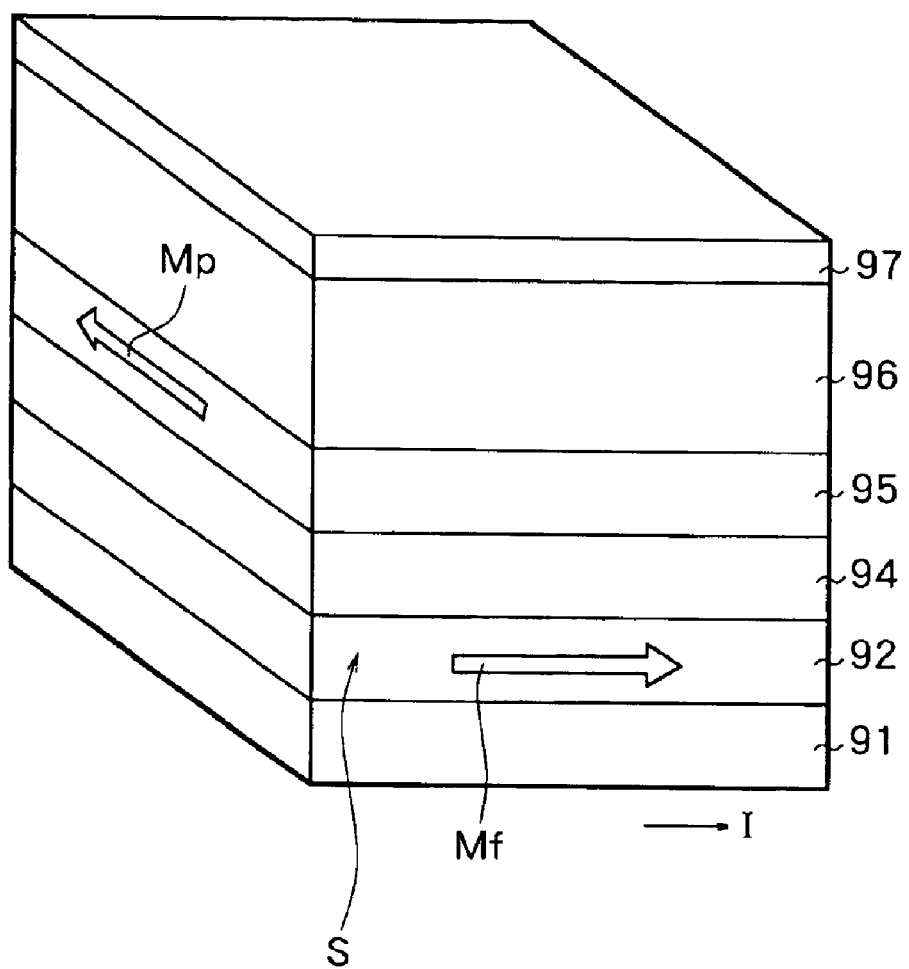
FIG. 17 is a perspective view of a structure of a stack of a conventional magnetic transducer.

Similarly to the modification of the first embodiment, the interlayer 29 may be provided in the first soft magnetic layer 22 as shown in FIG. 16. Alternatively, the interlayer 29 may be provided in the second soft magnetic layer 23 or between the first soft magnetic layer 22 and the second soft magnetic layer 23. In either case, the interlayer 29 may contain at least one element in a group consisting of Mn, Cr, Ni, Cu, Rh, Ir and Pt, or not. The inserted layer containing at least one element in a group consisting of Mn, Cr, Ni, Cu, Rh, Ir and Pt may be provided at least either on the surface of the interlayer 29 opposite to the nonmagnetic layer 24 or between the interlayer 29 and the nonmagnetic layer 24.

EXAMPLES

Specific examples of the invention will be described in detail.

Examples 1 to 10

The stacks 20 shown in FIG. 7 were prepared as examples 1 to 10, and the ferromagnetic interlayers 28 contained varying additives as shown in Table 1. First, the underlayer 21 of 3 nm thick was formed of Ta by sputtering on each insulating substrate made of $Al_2O_3$—TiC on which an $Al_2O_3$ film was formed. The first soft magnetic layer 22 of 2 nm thick was formed of NiFe on each underlayer 21. The second soft magnetic layer 23 of 2 nm thick was formed of CoFe on each first soft magnetic layer 22. The nonmagnetic layer 24 of 2.1 nm thick was formed of Cu on each second soft magnetic layer 23. The bottom layer 25a was formed of CoFe on each nonmagnetic layer 24. With allowing for something in the thickness to be oxidized by the following oxidation, the initial thickness of the bottom layer 25a was set at a valve more than a design specification so that the final thickness thereof after oxidizing process might be 1.8 nm.

Then, the metal layers 28a each having a thickness of 0.2 nm were formed of materials shown in Table 1 on the bottom layers 25a by sputtering. Each metal layer 28a and each bottom layer 25a were oxidized, whereby the interlayer 28 of 0.9 nm thick was formed. In the examples 8 to 10, an alloy plate of the metal layer 28a was used as a target to form the metal layer 28a. The thickness of the interlayer 28 was observed by a transmission electron microscope (TEM). Subsequently, the top layer 25b of 1 nm thick was formed of CoFe on each interlayer 28. The antiferromagnetic layer 26 of 13 nm thick was formed of PtMn on each top layer 25b. The capping layer 27 of 3 nm thick was formed of Ta on each antiferromagnetic layer 26. After forming the capping layer 27, the antiferromagnetic layer 26 was antiferromagnetized by heat treatment because the antiferromagnetic layer 26 was formed of a heat-treatment type antiferromagnetic material (PtMn).

TABLE 1

|  | Additive element | Rate of resistance change (%) | | | | |
|---|---|---|---|---|---|---|
|  |  | Initial properties | Heat treatment time | | | |
|  |  |  | 5 h | 10 h | 20 h | 60 h |
| Example |  |  |  |  |  |  |
| 1 | Mn | 11.3 | 11.2 | 11.0 | 10.5 | 9.0 |
| 2 | Cr | 11.5 | 11.3 | 11.1 | 10.6 | 9.2 |
| 3 | Ni | 11.4 | 11.2 | 10.9 | 10.1 | 8.5 |
| 4 | Cu | 11.0 | 10.8 | 10.6 | 9.6 | 7.9 |
| 5 | Rh | 11.1 | 10.9 | 10.5 | 10.0 | 8.5 |
| 6 | Ir | 11.1 | 10.8 | 10.4 | 9.7 | 8.4 |
| 7 | Pt | 11.5 | 11.4 | 11.0 | 10.5 | 9.0 |
| 8 | Rh, Mn | 11.4 | 11.2 | 10.9 | 10.2 | 8.7 |
| 9 | Pt, Cr | 11.3 | 11.1 | 10.6 | 10.0 | 8.0 |
| 10 | Pt, Mn | 11.7 | 11.6 | 11.4 | 10.9 | 9.6 |
| Comparison 1 | No additive element | 11.5 | 11.2 | 10.7 | 9.5 | 6.4 |

After the stacks 20 of the examples 1 to 10 prepared as mentioned above underwent heat treatment at 250° C. for 5 hours in a vacuum, the rate of resistance change of each stack 20 was measured and the measured value was taken as an initial properties value. Then, the stacks 20 further underwent heat treatment at 250% in a vacuum, and the rate of resistance change of each stack 20 was measured after 5 hours, 10 hours, 20 hours and 60 hours. Incidentally, the heating time refers to the time elapsed after 5-hour heat treatment. The rate of deterioration relative to the initial properties value after 5-hour heat treatment was calculated on the basis of the resultant rate of resistance change. The rate of deterioration was calculated in the following manner: the rate of resistance change after each heat treatment was divided by the initial properties value and then the resultant value was multiplied by 100. The resultant rates of deteriorations are shown in Table 1. The stack was prepared as a comparison to the examples under the same condition as the condition for the examples except that the interlayer 28 contained no additive. Heat deterioration properties of the comparison were examined in the same manner as the examples. The result of the examination is also shown in Tables 1 and 2.

TABLE 2

|  | Additive element | Rate of deterioration (%) | | | | |
|---|---|---|---|---|---|---|
|  |  | Initial properties | Heat treatment time | | | |
|  |  |  | 5 h | 10 h | 20 h | 60 h |
| Example |  |  |  |  |  |  |
| 1 | Mn | 100 | 99.1 | 97.3 | 92.9 | 80.0 |
| 2 | Cr | 100 | 98.3 | 96.5 | 92.2 | 80.3 |
| 3 | Ni | 100 | 98.2 | 95.6 | 88.6 | 74.6 |
| 4 | Cu | 100 | 98.2 | 96.4 | 87.3 | 71.8 |
| 5 | Rh | 100 | 98.2 | 94.6 | 89.6 | 76.6 |

TABLE 2-continued

|  | Additive element | Rate of deterioration (%) | | | | |
|---|---|---|---|---|---|---|
|  |  | Initial properties | Heat treatment time | | | |
|  |  |  | 5 h | 10 h | 20 h | 60 h |
| 6 | Ir | 100 | 97.3 | 93.7 | 87.4 | 75.7 |
| 7 | Pt | 100 | 99.1 | 95.7 | 91.3 | 78.3 |
| 8 | Rh, Mn | 100 | 98.2 | 95.6 | 89.5 | 76.3 |
| 9 | Pt, Cr | 100 | 98.2 | 93.8 | 88.5 | 70.8 |
| 10 | Pt, Mn | 100 | 99.1 | 97.4 | 93.2 | 82.1 |
| Comparison 1 | No additive element | 100 | 97.4 | 93.0 | 82.6 | 55.7 |

As can be seen from Tables 1 and 2, even after 60-hour heat treatment, the rates of deteriorations of the examples were 70% or more, which could be higher than the rate of deterioration of the comparison, i.e., 55.7%. In other words, it turns out that the interlayer 28 contains at least one element in a group consisting of Mn, Cr, Ni, Cu, Rh, Ir and Pt, whereby heat deterioration can be prevented.

Examples 11 to 18

The stacks 50 shown in FIG. 16 were prepared as examples 11 to 18, and the inserted layers 60 were made of varying materials as shown in Table 3. First, the underlayer 21 of 3 nm thick was formed of Ta by sputtering on each insulating substrate made of $Al_2O_3$—TiC on which an $Al_2O_3$ film was formed. The bottom layer 22a was formed of NiFe on each underlayer 21. After previously allowing for the thickness to be oxidized by the following oxidation, the thickness of the bottom layer 22a was set so that the thickness of the oxidized bottom layer 22a might be 2.0 nm. Then, the surface of each bottom layer 22a was oxidized, whereby the interlayer 29 of 0.6 nm thick was formed. The thickness of the interlayer 29 was observed by the TEM. Subsequently, the top layer 22b of 0.5 nm thick was formed of NiFe on each interlayer 29 by sputtering. The second soft magnetic layer 23 of 1.5 nm thick was formed of CoFe on each top layer 22b. The nonmagnetic layer 24 of 2.1 nm thick was formed of Cu on each second soft magnetic layer 23. The bottom layer 55a was formed of CoFe on each nonmagnetic layer 24. After previously allowing for the thickness to be oxidized by the following oxidation, the thickness of the bottom layer 55a was set so that the thickness of the oxidized bottom layer 55a might be 1.8 nm.

TABLE 3

|  | Material of inserted layer | Rate of resistance change (%) | | | | |
|---|---|---|---|---|---|---|
|  |  | Initial properties | Heat treatment time | | | |
|  |  |  | 5 h | 10 h | 20 h | 60 h |
| Example |  |  |  |  |  |  |
| 11 | Mn | 13.5 | 13.3 | 12.9 | 12.2 | 10.7 |
| 12 | Cr | 13.6 | 13.2 | 12.8 | 12.1 | 10.5 |
| 13 | Rh | 13.4 | 13.2 | 12.8 | 12.0 | 10.0 |
| 14 | Pt | 13.7 | 13.5 | 13.0 | 12.4 | 10.4 |
| 15 | NiFe | 13.5 | 13.2 | 12.7 | 11.9 | 10.5 |
| 16 | RhMn | 13.3 | 12.9 | 12.5 | 11.7 | 9.9 |
| 17 | IrMn | 13.4 | 13.0 | 12.5 | 11.7 | 9.7 |
| 18 | PtMn | 13.6 | 13.4 | 13.0 | 12.5 | 11.0 |
| Comparison 2 | No inserted layer | 13.6 | 13.3 | 12.4 | 11.0 | 7.7 |

After forming the bottom layer 55a, the surface of each bottom layer 55a was oxidized, whereby the ferromagnetic interlayer 59 of 0.9 nm thick was formed. The thickness of the ferromagnetic interlayer 59 was observed by the TEM. After that, the inserted layers 60 each having a thickness of 0.2 nm were formed of materials shown in Table 3 on the ferromagnetic interlayers 59. The top layer 55b of 1 nm thick was formed of CoFe on each inserted layer 60. The antiferromagnetic layer 26 of 13 nm thick was formed of PtMn on each top layer 55b. The capping layer 27 of 3 nm thick was formed of Ta on each antiferromagnetic layer 26. After forming the capping layer 27, the antiferromagnetic layer 26 was antiferromagnetized by heat treatment because the antiferromagnetic layer 26 was formed of a heat-treatment type antiferromagnetic material (PtMn).

Heat deterioration properties of the stacks 50 of the examples 11 to 18 prepared as mentioned above were examined in the same manner as the examples 1 to 10. The result of examination is shown in Tables 3 and 4. The stack was prepared as a comparison to the examples 11 to 18 under the same condition as the condition for the examples except that the inserted layer 60 is not provided. Heat deterioration properties of the comparison were examined in the same manner as the examples. The result of examination is also shown in Tables 3 and 4.

TABLE 4

| Material of inserted layer | Rate of deterioration (%) | | | | |
|---|---|---|---|---|---|
| | Initial properties | Heat treatment time | | | |
| | | 5 h | 10 h | 20 h | 60 h |
| Example | | | | | |
| 11 | Mn | 100 | 98.5 | 95.6 | 90.4 | 79.3 |
| 12 | Cr | 100 | 97.1 | 94.1 | 89.0 | 77.2 |
| 13 | Rh | 100 | 98.5 | 95.5 | 89.6 | 74.6 |
| 14 | Pt | 100 | 98.5 | 94.9 | 90.5 | 75.9 |
| 15 | NiFe | 100 | 97.8 | 94.1 | 88.1 | 77.8 |
| 16 | RhMn | 100 | 97.0 | 94.0 | 88.0 | 74.4 |
| 17 | IrMn | 100 | 97.0 | 93.3 | 87.3 | 72.4 |
| 18 | PtMn | 100 | 98.5 | 95.6 | 91.9 | 80.9 |
| Comparison 2 | No inserted layer | 100 | 97.8 | 91.2 | 80.9 | 56.6 |

As can be seen from Tables 3 and 4, even after 60-hour heat treatment, the rates of deteriorations of the examples were 72% or more, which could be higher than the rate of deterioration of the comparison, i.e., 55.6%. In other words, it turns out that the inserted layer 60 containing at least one element in a group consisting of Mn, Cr, Ni, Cu, Rh, Ir and Pt is provided, whereby heat deterioration can be prevented.

Examples 19 to 26

Next, the stacks 50 shown in FIG. 16 were prepared as examples 19 to 26 in the same manner as the examples 11 to 18 except that the inserted layers 60 were made of varying materials and had varying thicknesses. Heat deterioration properties of the prepared stacks 50 of the examples 19 to 26 were examined in the same manner as the examples 1 to 10. The result of the examination is shown in Tables 5 and 6. Tables 5 and 6 also shown the result of the examination of the comparison shown in Tables 3 and 4.

TABLE 5

| | Material of inserted layer | Thickness of inserted layer (nm) | Rate of resistance change (%) | | | | |
|---|---|---|---|---|---|---|---|
| | | | Initial properties | Heat treatment time | | | |
| | | | | 5 h | 10 h | 20 h | 60 h |
| Example | | | | | | | |
| 19 | Mn | 0.03 | 13.4 | 13.0 | 12.2 | 10.6 | 7.4 |
| 20 | Mn | 0.2 | 13.5 | 13.3 | 12.9 | 12.2 | 10.7 |
| 21 | Mn | 0.4 | 12.2 | 12.0 | 11.4 | 10.8 | 9.9 |
| 22 | Mn | 0.6 | 9.5 | 9.3 | 9.0 | 8.5 | 6.7 |
| 23 | PtMn | 0.03 | 13.7 | 13.3 | 12.4 | 10.8 | 8.2 |
| 24 | PtMn | 0.2 | 13.6 | 13.4 | 13.0 | 12.5 | 11.0 |
| 25 | PtMn | 0.4 | 12.7 | 12.4 | 12.1 | 11.5 | 10.1 |
| 26 | PtMn | 0.6 | 10.1 | 9.9 | 9.5 | 8.9 | 7.5 |
| Comparison 3 | No inserted layer | 0 | 13.6 | 13.3 | 12.4 | 11.0 | 7.7 |

TABLE 6

| | Material of inserted layer | Thickness of inserted layer (nm) | Rate of deterioration (%) | | | | |
|---|---|---|---|---|---|---|---|
| | | | Initial properties | Heat treatment time | | | |
| | | | | 5 h | 10 h | 20 h | 60 h |
| Example | | | | | | | |
| 19 | Mn | 0.03 | 100 | 97.0 | 91.0 | 79.1 | 55.2 |
| 20 | Mn | 0.2 | 100 | 98.5 | 95.6 | 90.4 | 79.3 |
| 21 | Mn | 0.4 | 100 | 98.4 | 93.8 | 88.5 | 81.1 |
| 22 | Mn | 0.6 | 100 | 97.9 | 94.7 | 89.5 | 70.5 |
| 23 | PtMn | 0.03 | 100 | 97.1 | 90.5 | 78.8 | 59.9 |
| 24 | PtMn | 0.2 | 100 | 98.5 | 95.6 | 91.9 | 80.9 |
| 25 | PtMn | 0.4 | 100 | 97.6 | 95.3 | 90.6 | 79.5 |
| 26 | PtMn | 0.6 | 100 | 98.0 | 94.1 | 88.1 | 74.3 |
| Comparison 3 | No inserted layer | 0 | 100 | 97.8 | 91.2 | 80.9 | 56.6 |

As can be seen from Tables 5 and 6, when the thickness of the inserted layer 60 was equal to 0.03 nm, heat deterioration properties of the examples were about the same as heat deterioration properties of the comparison. When the thickness of the inserted layer 60 was more than 0.03 nm, heat deterioration properties of the examples could be greatly improved as compared to heat deterioration properties of the comparison. When the thickness of the inserted layer 60 was equal to 0.6 nm, the rate of resistance change of the examples was lower than the rate of resistance change of the comparison. When the thickness of the inserted layer 60 was less than 0.6 nm, the rate of resistance change of the examples could be about equal to the rate of resistance change of the comparison.

In other words, it turns out that the thickness of the inserted layer 60 is more than 0.03 nm, whereby heat deterioration in the rate of resistance change can be more efficiently prevented, and that the thickness of the inserted layer 60 is less than 0.6 nm, whereby the rate of resistance change can be kept high.

Although the stacks of the above-mentioned examples have been specifically described by referring to some examples, stacks having other structures can achieve the same effects as long as the interlayer contains at least one element in a group consisting of Mn, Cr, Ni, Cu, Rh, Ir and Pt or the inserted layer is provided.

Although the invention has been described above by referring to some embodiments and examples, the invention is not limited to these embodiments and examples and various modifications of the invention are possible. For example, the stack can have a structure in which the ferromagnetic interlayer is not provided in the ferromagnetic layer, the soft magnetic interlayer is provided in the soft magnetic layer and the soft magnetic interlayer contains the additive. In this case, the inserted layer may be provided at least either on the surface of the soft magnetic interlayer opposite to the nonmagnetic layer or between the ferromagnetic interlayer and the nonmagnetic layer, instead of that the soft magnetic interlayer contains the additive.

When the soft magnetic interlayer is provided in the soft magnetic layer and the ferromagnetic interlayer is provided in the ferromagnetic layer, the ferromagnetic interlayer may contain the additive, and the inserted layer may be provided at least either on the surface of the soft magnetic interlayer opposite to the nonmagnetic layer or between the soft magnetic interlayer and the nonmagnetic layer. The stack can have a structure in which the ferromagnetic interlayer contains no additive and the soft magnetic interlayer contains the additive. In this case, the inserted layer may be provided at least either on the surface of the soft magnetic interlayer opposite to the nonmagnetic layer or between the ferromagnetic interlayer and the nonmagnetic layer, instead of that the soft magnetic interlayer contains the additive.

In the above-mentioned embodiments and examples, the description has been given with regard to the case in which the first soft magnetic layer 22 or 52, the second soft magnetic layer 23, the nonmagnetic layer 24, the ferromagnetic layer 25 or 55 and the antiferromagnetic layer 26 are stacked in order in such a manner that the first soft magnetic layer 22 or 52 is the undermost layer. However, these layers may be stacked in reverse order, i.e., in such a manner that the antiferromagnetic layer 26 is the undermost layer. In other words, the invention can be widely applied to a magnetic transducer having a nonmagnetic layer having a pair of surfaces opposing each other, a soft magnetic layer formed on one surface of the nonmagnetic layer, a ferromagnetic layer formed on the other surface of the nonmagnetic layer, and an antiferromagnetic layer formed on the ferromagnetic layer on the side opposite to the nonmagnetic layer.

In the above-mentioned embodiments and examples, the description has been given with regard to the case in which the soft magnetic layer has a two-layer structure comprising the first soft magnetic layer and the second soft magnetic layer. However, the soft magnetic layer may have a single-layer structure or a stacked structure comprising three layers or more.

The magnetic domain controlling ferromagnetic films 31a and 31b and the magnetic domain controlling antiferromagnetic films 32a and 32b may be replaced with a hard magnetic material as the magnetic domain control films 30a and 30b shown in FIG. 6. In this case, a stacked film of a TiW layer and a CoPt layer, a stacked film of a TiW layer and a CoCrPt layer, or the like can be used.

In the above-mentioned embodiments, both the antiferromagnetic layer 26 and the magnetic domain controlling antiferromagnetic films 32a and 32b are made of the heat-treatment type antiferromagnetic material. However, the antiferromagnetic layer 26 and the magnetic domain controlling antiferromagnetic films 32a and 32b may be made of the heat-treatment type antiferromagnetic material and the non-heat-treatment type antiferromagnetic material, respectively. Alternatively, the antiferromagnetic layer 26 and the magnetic domain controlling antiferromagnetic films 32a and 32b may be made of the non-heat-treatment type antiferromagnetic material and the heat-treatment type antiferromagnetic material, respectively. Alternatively, both the antiferromagnetic layer 26 and the magnetic domain controlling antiferromagnetic films 32a and 32b may be made of the non-heat-treatment type antiferromagnetic material.

In the above-mentioned embodiments, the description has been given with regard to the case in which the magnetic transducer of the invention is used in a composite thin film magnetic head. However, the magnetic transducer of the invention can be also used in a thin film magnetic head for reproducing only. Moreover, the recording head and the reproducing head may be stacked in reverse order.

Additionally, the configuration of the magnetic transducer of the invention may be applied to a tunnel junction type magnetoresistive film (a TMR film). Furthermore, the magnetic transducer of the invention is applicable to, for example, a sensor (an accelerometer or the like) for detecting a magnetic signal, a memory for storing a magnetic signal, or the like, as well as the thin film magnetic head described by referring to the above-mentioned embodiments.

As described above, according to a magnetic transducer, a thin film magnetic head, a method of manufacturing a magnetic transducer or a method of manufacturing a thin film magnetic head according to a first aspect of the invention, the interlayer is formed in at least either the soft magnetic layer or the ferromagnetic layer, the interlayer has magnetism and has higher electrical resistance than the electrical resistance of at least a part of the layer in which the interlayer is formed, and the interlayer contains at least one element in a group consisting of Mn, Cr, Ni, Cu, Rh, Ir and Pt. Therefore, the rate of resistance change can be increased, and high thermal stability can be obtained.

According to a magnetic transducer, a thin film magnetic head, a method of manufacturing a magnetic transducer or a method of manufacturing a thin film magnetic head according to a second aspect of the invention, the interlayer is formed in at least either the soft magnetic layer or the ferromagnetic layer, the interlayer has magnetism and has higher electrical resistance than the electrical resistance of at least a part of the layer in which the interlayer is formed, the inserted layer is formed at least either between the interlayer and the nonmagnetic layer or on the side opposite to the nonmagnetic layer with respect to the interlayer, and the inserted layer contains at least one element in a group consisting of Mn, Cr, Ni, Cu, Rh, Ir and Pt. Therefore, the rate of resistance change can be increased, and high thermal stability can be obtained.

According to a magnetic transducer or a thin film magnetic head according to a third aspect of the invention, the interlayer is formed in at least either the soft magnetic layer or the ferromagnetic layer, the interlayer has magnetism and has higher electrical resistance than the electrical resistance of at least a part of the layer in which the interlayer is formed, and the thermal stabilization layer is formed at least either between the interlayer and the nonmagnetic layer or on the interlayer on the side opposite to the nonmagnetic layer. Therefore, the rate of resistance change can be increased, and high thermal stability can be obtained.

When the thickness of the interlayer is from 0.5 nm to 1.0 nm inclusive, a higher rate of resistance change can be obtained with the magnetic layers magnetically integrated with each other.

When the thickness of the inserted layer is more than 0.03 nm and less than 0.6 nm, high thermal stability can be obtained with a higher rate of resistance change kept.

When the metal layer made of at least one element in a group consisting of Mn, Cr, Ni, Cu, Rh, Ir and Pt is formed in the magnetic layer and the interlayer is formed by performing at least one of oxidizing process and nitriding process to a part of the magnetic layer and the metal layer, the interlayer can be obtained by a simple method.

Obviously many modifications and variations of the present invention are possible in the light of the above teachings. It is therefore to be understood that within the scope of the appended claims the invention may be practiced otherwise than as specifically described.

What is claimed is:

1. A magnetic transducer, comprising:
   a nonmagnetic layer having a pair of surfaces opposing each other;
   a soft magnetic layer formed on one surface of the nonmagnetic layer;
   a ferromagnetic layer formed on the other surface of the nonmagnetic layer;
   an antiferromagnetic layer formed on the ferromagnetic layer on the side opposite to the nonmagnetic layer;
   an interlayer formed in a layer which is at least either the soft magnetic layer or the ferromagnetic layer, the interlayer having magnetism and having higher electrical resistance than the electrical resistance of at least a part of the layer in which the interlayer is formed, wherein one of the following conditions is satisfied:
   1) the interlayer contains at least one element in a group consisting of manganese (Mn), chromium (Cr), nickel (Ni), copper (Cu), rhodium (Rh), iridium (Ir) and platinum (Pt),
   2) the magnetic transducer further comprises an inserted layer formed at least either between the interlayer and the nonmagnetic layer or on the side opposite to the nonmagnetic layer with respect to the interlayer, the inserted layer containing at least one element in a group consisting of manganese, chromium, nickel, copper, rhodium, iridium and platinum, or
   3) the magnetic transducer further comprises a thermal stabilization layer formed at least either between the interlayer and the nonmagnetic layer or on the side opposite to the nonmagnetic layer with respect to the interlayer.

2. A magnetic transducer according to claim 1, wherein a thickness of the interlayer is from 0.5 nm to 1 nm inclusive.

3. A magnetic transducer according to claim 1, wherein the interlayer contains at least one element in a group consisting of oxygen (O) and nitrogen (N).

4. A magnetic transducer according to claim 1, wherein the interlayer contains at least one of elements which are contained in the layer in which the interlayer is formed.

5. A magnetic transducer according to claim 1, wherein the soft magnetic layer has a first soft magnetic layer containing at least nickel in a group consisting of nickel, cobalt (Co), iron (Fe), tantalum (Ta), chromium, rhodium, molybdenum (Mo) and niobium (Nb), and a second soft magnetic layer containing at least cobalt in a group consisting of nickel, cobalt and iron.

6. A magnetic transducer according to claim 1, wherein the ferromagnetic layer contains at least cobalt in a group consisting of cobalt and iron.

7. A magnetic transducer according to claim 1, wherein the inserted layer is formed at least either between the interlayer and the nonmagnetic layer or on the side opposite to the nonmagnetic layer with respect to the interlayer, the inserted layer containing at least one element in a group consisting of manganese, chromium, nickel, copper, rhodium, iridium and platinum and a thickness of the inserted layer is more than 0.03 nm and less than 0.6 nm.

8. A thin film magnetic head having a magnetic transducer, a magnetic transducer comprising:
   a nonmagnetic layer having a pair of surfaces opposing each other;
   a soft magnetic layer formed on one surface of the nonmagnetic layer;
   a ferromagnetic layer formed on the other surface of the nonmagnetic layer;
   an antiferromagnetic layer formed on the ferromagnetic layer on the side opposite to the nonmagnetic layer;
   an interlayer formed in a layer which is at least either the soft magnetic layer or the ferromagnetic layer, the interlayer having magnetism and having higher electrical resistance than the electrical resistance of at least a part of the layer in which the interlayer is formed, wherein one of the following conditions is satisfied:
   1) the interlayer contains at least one element in a group consisting of manganese, chromium, nickel, copper, rhodium, iridium and platinum,
   2) the magnetic transducer further comprises an inserted layer formed at least either between the interlayer and the nonmagnetic layer or on the side opposite to the nonmagnetic layer with respect to the interlayer, the inserted layer containing at least one element in a group consisting of manganese, chromium, nickel, copper, rhodium, iridium and platinum, or
   3) the magnetic transducer further comprises a thermal stabilization layer formed at least either between the interlayer and the nonmagnetic layer or on the side opposite to the nonmagnetic layer with respect to the interlayer.

9. A method of manufacturing a magnetic transducer, including a nonmagnetic layer having a pair of surfaces opposing each other, a soft magnetic layer formed on one surface of the nonmagnetic layer, a ferromagnetic layer formed on the other surface of the nonmagnetic layer, and an antiferromagnetic layer formed on the ferromagnetic layer on the side opposite to the nonmagnetic layer, the method including the steps of:
   forming an interlayer in a layer which is at least either the soft magnetic layer or the ferromagnetic layer, the interlayer having magnetism and having higher electrical resistance than the electrical resistance of at least a part of the layer in which the interlayer is formed, the interlayer containing at least one element in a group consisting of manganese, chromium, nickel, copper, rhodium, iridium and platinum.

10. A method of manufacturing a magnetic transducer according to claim 9, wherein the step of forming the interlayer includes the steps of:
   forming a metal layer made of at least one element in a group consisting of manganese, chromium, nickel, copper, iridium and platinum in the layer in which the interlayer is formed; and
   performing at least one of oxidizing process and nitriding process to a part of at least either the soft magnetic layer or the ferromagnetic layer and the metal layer.

11. A method of manufacturing a magnetic transducer, including a nonmagnetic layer having a pair of surfaces opposing each other, a soft magnetic layer formed on one surface of the nonmagnetic layer, a ferromagnetic layer formed on the other surface of the nonmagnetic layer, and an antiferromagnetic layer formed on the ferromagnetic layer on the side opposite to the nonmagnetic layer, the method including the steps of:

forming an interlayer in a layer which is at least either the soft magnetic layer or the ferromagnetic layer, the interlayer having magnetism and having higher electrical resistance than the electrical resistance of at least a part of the layer in which the interlayer is formed; and forming an inserted layer at least between the interlayer and the nonmagnetic layer or on the side opposite to the nonmagnetic layer with respect to the interlayer, the inserted layer containing at least one element in a group consisting of manganese, chromium, nickel, copper, rhodium, iridium and platinum.

12. A method of manufacturing a thin film magnetic head having a magnetic transducer, including a nonmagnetic layer having a pair of surfaces opposing each other, a soft magnetic layer formed on one surface of the nonmagnetic layer, a ferromagnetic layer formed on the other surface of the nonmagnetic layer, and an antiferromagnetic layer formed on the ferromagnetic layer on the side opposite to the nonmagnetic layer, the method including the steps of:

forming an interlayer in a layer which is at least either the soft magnetic layer or the ferromagnetic layer, the interlayer having magnetism and having higher electrical resistance than the electrical resistance of at least a part of the layer in which the interlayer is formed, the interlayer containing at least one element in a group consisting of manganese, chromium, nickel, copper, rhodium, iridium and platinum.

13. A method of manufacturing a thin film magnetic head having a magnetic transducer, including a nonmagnetic layer having a pair of surfaces opposing each other, a soft magnetic layer formed on one surface of the nonmagnetic layer, a ferromagnetic layer formed on the other surface of the nonmagnetic layer, and an antiferromagnetic layer formed on the ferromagnetic layer on the side opposite to the nonmagnetic layer, the method including the steps of:

forming an interlayer in a layer which is at least either the soft magnetic layer or the ferromagnetic layer, the interlayer having magnetism and having higher electrical resistance than the electrical resistance of at least a part of the layer in which the interlayer is formed; and forming an inserted layer at least either between the interlayer and the nonmagnetic layer or on the side opposite to the nonmagnetic layer with respect to the interlayer, the inserted layer containing at least one element in a group consisting of manganese, chromium, nickel, copper, rhodium, iridium and platinum.

* * * * *